US011432315B2

(12) United States Patent
Matsumura et al.

(10) Patent No.: US 11,432,315 B2
(45) Date of Patent: Aug. 30, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 16/647,361

(22) PCT Filed: Sep. 15, 2017

(86) PCT No.: PCT/JP2017/033598
§ 371 (c)(1),
(2) Date: Mar. 13, 2020

(87) PCT Pub. No.: WO2019/053903
PCT Pub. Date: Mar. 21, 2019

(65) Prior Publication Data
US 2021/0185712 A1 Jun. 17, 2021

(51) Int. Cl.
H04W 72/12 (2009.01)
H04L 1/18 (2006.01)
(Continued)

(52) U.S. Cl.
CPC ....... H04W 72/1284 (2013.01); H04L 1/1887 (2013.01); H04L 5/0055 (2013.01); H04L 27/2607 (2013.01)

(58) Field of Classification Search
CPC ............. H04W 72/1284; H04W 72/04; H04W 72/0446; H04W 74/0841; H04W 72/0413;
(Continued)

(56) References Cited

U.S. PATENT DOCUMENTS

2012/0076089 A1* 3/2012 Kawamura ........... H04L 1/0031
370/329
2019/0058516 A1* 2/2019 Yang ................... H04L 27/2607
(Continued)

OTHER PUBLICATIONS

Huawei, HiSilicon; "Short PUCCH for UCI of up to 2 bits"; 3GPP TSG RAN WG1 Meeting AH_NR#3, R1-1715399; Nagoya, Japan, Sep. 18-21, 2017 (17 pages) (Year: 2017).*
(Continued)

Primary Examiner — Hardikkumar D Patel
(74) Attorney, Agent, or Firm — Osha Bergman Watanabe & Burton LLP

(57) ABSTRACT

A terminal is disclosed including a transmitter that transmits uplink control information including a Hybrid Automatic Repeat reQuest-ACKnowledge (HARQ-ACK) in an uplink control channel; and a processor that uses a cyclic shift in the transmission of the uplink control information, the cyclic shift being determined based on a sum of an index and a value mapped to the uplink control information, wherein a value mapped to first uplink control information including HARQ-ACK information and a negative Scheduling Request (SR) is equal to a value mapped to second uplink control information including the HARQ-ACK information and not including a positive SR or the negative SR. In other aspects, a radio control method and a base station are also disclosed.

4 Claims, 22 Drawing Sheets

(51) Int. Cl.
*H04L 5/00* (2006.01)
*H04L 27/26* (2006.01)

(58) Field of Classification Search
CPC ...... H04W 4/70; H04L 1/1887; H04L 5/0055; H04L 27/2607; H04L 1/1896; H04L 5/0053; H04L 1/1854; H04L 5/001; H04L 1/0031; H04L 1/0073; H04L 27/2666; H04L 1/1819; H04L 5/0048; H04L 5/1469; H04L 5/0044; H04L 1/1671; H04L 1/1864; H04L 5/0007; H04B 7/0626; H04B 7/0495; H03M 13/136; H03M 13/23

See application file for complete search history.

(56) References Cited

U.S. PATENT DOCUMENTS

2019/0141696 A1* 5/2019 Kim .................. H04W 72/0413
2019/0289586 A1* 9/2019 Ouchi .................. H04W 28/04

OTHER PUBLICATIONS

ZTE, Sanechips; "On short PUCCH for up to 2 bits UCI"; 3GPP TSG RAN WG1 Meeting AH_NR#3, R1-1715522; Nagoya, Japan, Sep. 18-21, 2017 (8 pages) (Year: 2017).*
Extended European Search Report issued in counterpart European Patent Application No. 17925430.5, dated Mar. 24, 2021 (13 pages).
NTT DOCOMO, Inc.; "Long-PUCCH for up to 2 bits"; 3GPP TSG RAN WG1 NR Ad-Hoc#3, R1-1716100; Nagoya, Japan, Sep. 18-21, 2017 (9 pages).
Huawei, HiSilicon; "Short PUCCH for UCI of up to 2 bits"; 3GPP TSG RAN WG1 Meeting AH_NR#3, R1-1715399; Nagoya, Japan, Sep. 18-21, 2017 (17 pages).
ZTE, Sanechips; "On short PUCCH for up to 2 bits UCI"; 3GPP TSG RAN WG1 Meeting AH_NR#3, R1-1715522; Nagoya, Japan, Sep. 18-21, 2017 (8 pages).
CATT; "Further details of short PUCCH for up to two UCI bits"; 3GPP TSG RAN WG1 Meeting #90, R1-1712400; Prague, Czechia, Aug. 21-25, 2017 (4 pages).
International Search Report issued in PCT/JP2017/033598 dated Nov. 28, 2017 (1 page).
Written Opinion of the International Searching Authority issued in PCT/JP2017/033598 dated Nov. 28, 2017 (4 pages).
Guangdong OPPO Mobile Telecom; "Short-PUCCH for up to 2 UCI bits"; 3GPP TSG RAN WG1 Meeting NR#3, R1-1715680; Nagoya, Japan; Sep. 18-21, 2017 (4 pages).
NTT DOCOMO, Inc.; "Short-PUCCH for UCI of up to 2 bits"; 3GPP TSG RAN WG1 Meeting NR Ad-Hoc#3, R1-1716098; Nagoya, Japan; Sep. 18-21, 2017 (17 pages).
3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in counterpart Japanese Application No. 2019-541616 dated Oct. 5, 2021 (12 pages).
Office Action issued in European Application No. 17925430.5; dated Dec. 23, 2021 (6 pages).
Office Action in counterpart Japanese Patent Application No. 2019-541616 dated Jan. 18, 2022 (6 pages).
Office Action in counterpart Indian Patent Application No. 202037009788 dated Mar. 29, 2022 (7 pages).

* cited by examiner

| SIGNALING FIELD | PUCCH RESOURCE | |
| --- | --- | --- |
| | POSITIVE SR | NEGATIVE SR / NO SR |
| 00 | RESOURCE OF HARQ-ACK SPECIFIC VALUE (PRB, SYMBOL, CS, AND SEQUENCE) | RESOURCE OF HARQ-ACK SPECIFIC VALUE (PRB, SYMBOL, CS, AND SEQUENCE) |
| 01 | RESOURCE OF HARQ-ACK SPECIFIC VALUE (PRB, SYMBOL, CS, AND SEQUENCE) | RESOURCE OF HARQ-ACK SPECIFIC VALUE (PRB, SYMBOL, CS, AND SEQUENCE) |
| 10 | RESOURCE OF HARQ-ACK SPECIFIC VALUE (PRB, SYMBOL, CS, AND SEQUENCE) | RESOURCE OF HARQ-ACK SPECIFIC VALUE (PRB, SYMBOL, CS, AND SEQUENCE) |
| 11 | RESOURCE OF HARQ-ACK SPECIFIC VALUE (PRB, SYMBOL, CS, AND SEQUENCE) | RESOURCE OF HARQ-ACK SPECIFIC VALUE (PRB, SYMBOL, CS, AND SEQUENCE) |

FIG. 3

| SIGNALING FIELD | PUCCH RESOURCE | |
|---|---|---|
| | POSITIVE SR | NEGATIVE SR / NO SR |
| 00 | RESOURCE OF HARQ-ACK "0"<br>RESOURCE OF HARQ-ACK "1"<br>(PRB, SYMBOL, CS, AND SEQUENCE) | RESOURCE OF HARQ-ACK "0"<br>RESOURCE OF HARQ-ACK "1"<br>(PRB, SYMBOL, CS, AND SEQUENCE) |
| 01 | RESOURCE OF HARQ-ACK "0"<br>RESOURCE OF HARQ-ACK "1"<br>(PRB, SYMBOL, CS, AND SEQUENCE) | RESOURCE OF HARQ-ACK "0"<br>RESOURCE OF HARQ-ACK "1"<br>(PRB, SYMBOL, CS, AND SEQUENCE) |
| 10 | RESOURCE OF HARQ-ACK "0"<br>RESOURCE OF HARQ-ACK "1"<br>(PRB, SYMBOL, CS, AND SEQUENCE) | RESOURCE OF HARQ-ACK "0"<br>RESOURCE OF HARQ-ACK "1"<br>(PRB, SYMBOL, CS, AND SEQUENCE) |
| 11 | RESOURCE OF HARQ-ACK "0"<br>RESOURCE OF HARQ-ACK "1"<br>(PRB, SYMBOL, CS, AND SEQUENCE) | RESOURCE OF HARQ-ACK "0"<br>RESOURCE OF HARQ-ACK "1"<br>(PRB, SYMBOL, CS, AND SEQUENCE) |

FIG. 4

| SIGNALING FIELD | PUCCH RESOURCE | |
|---|---|---|
| | POSITIVE SR | NEGATIVE SR / NO SR |
| 00 | RESOURCE OF HARQ-ACK "00"<br>RESOURCE OF HARQ-ACK "01"<br>RESOURCE OF HARQ-ACK "11"<br>RESOURCE OF HARQ-ACK "10"<br>(PRB, SYMBOL, CS, AND SEQUENCE) | RESOURCE OF HARQ-ACK "00"<br>RESOURCE OF HARQ-ACK "01"<br>RESOURCE OF HARQ-ACK "11"<br>RESOURCE OF HARQ-ACK "10"<br>(PRB, SYMBOL, CS, AND SEQUENCE) |
| 01 | RESOURCE OF HARQ-ACK "00"<br>RESOURCE OF HARQ-ACK "01"<br>RESOURCE OF HARQ-ACK "11"<br>RESOURCE OF HARQ-ACK "10"<br>(PRB, SYMBOL, CS, AND SEQUENCE) | RESOURCE OF HARQ-ACK "00"<br>RESOURCE OF HARQ-ACK "01"<br>RESOURCE OF HARQ-ACK "11"<br>RESOURCE OF HARQ-ACK "10"<br>(PRB, SYMBOL, CS, AND SEQUENCE) |
| 10 | RESOURCE OF HARQ-ACK "00"<br>RESOURCE OF HARQ-ACK "01"<br>RESOURCE OF HARQ-ACK "11"<br>RESOURCE OF HARQ-ACK "10"<br>(PRB, SYMBOL, CS, AND SEQUENCE) | RESOURCE OF HARQ-ACK "00"<br>RESOURCE OF HARQ-ACK "01"<br>RESOURCE OF HARQ-ACK "11"<br>RESOURCE OF HARQ-ACK "10"<br>(PRB, SYMBOL, CS, AND SEQUENCE) |
| 11 | RESOURCE OF HARQ-ACK "00"<br>RESOURCE OF HARQ-ACK "01"<br>RESOURCE OF HARQ-ACK "11"<br>RESOURCE OF HARQ-ACK "10"<br>(PRB, SYMBOL, CS, AND SEQUENCE) | RESOURCE OF HARQ-ACK "00"<br>RESOURCE OF HARQ-ACK "01"<br>RESOURCE OF HARQ-ACK "11"<br>RESOURCE OF HARQ-ACK "10"<br>(PRB, SYMBOL, CS, AND SEQUENCE) |

FIG. 5

| SIGNALING FIELD | PUCCH RESOURCE | | |
|---|---|---|---|
| | POSITIVE SR | NEGATIVE SR | NO SR |
| 00 | RESOURCE OF HARQ-ACK SPECIFIC VALUE (PRB, SYMBOL, CS, AND SEQUENCE) | RESOURCE OF HARQ-ACK SPECIFIC VALUE (PRB, SYMBOL, CS, AND SEQUENCE) | RESOURCE OF HARQ-ACK SPECIFIC VALUE (PRB, SYMBOL, CS, AND SEQUENCE) |
| 01 | RESOURCE OF HARQ-ACK SPECIFIC VALUE (PRB, SYMBOL, CS, AND SEQUENCE) | RESOURCE OF HARQ-ACK SPECIFIC VALUE (PRB, SYMBOL, CS, AND SEQUENCE) | RESOURCE OF HARQ-ACK SPECIFIC VALUE (PRB, SYMBOL, CS, AND SEQUENCE) |
| 10 | RESOURCE OF HARQ-ACK SPECIFIC VALUE (PRB, SYMBOL, CS, AND SEQUENCE) | RESOURCE OF HARQ-ACK SPECIFIC VALUE (PRB, SYMBOL, CS, AND SEQUENCE) | RESOURCE OF HARQ-ACK SPECIFIC VALUE (PRB, SYMBOL, CS, AND SEQUENCE) |
| 11 | RESOURCE OF HARQ-ACK SPECIFIC VALUE (PRB, SYMBOL, CS, AND SEQUENCE) | RESOURCE OF HARQ-ACK SPECIFIC VALUE (PRB, SYMBOL, CS, AND SEQUENCE) | RESOURCE OF HARQ-ACK SPECIFIC VALUE (PRB, SYMBOL, CS, AND SEQUENCE) |

FIG. 6

| SIGNALING FIELD | PUCCH RESOURCE | | |
|---|---|---|---|
| | POSITIVE SR | NEGATIVE SR | NO SR |
| 00 | RESOURCE OF HARQ-ACK "0" RESOURCE OF HARQ-ACK "1" (PRB, SYMBOL, CS, AND SEQUENCE) | RESOURCE OF HARQ-ACK "0" RESOURCE OF HARQ-ACK "1" (PRB, SYMBOL, CS, AND SEQUENCE) | RESOURCE OF HARQ-ACK "0" RESOURCE OF HARQ-ACK "1" (PRB, SYMBOL, CS, AND SEQUENCE) |
| 01 | RESOURCE OF HARQ-ACK "0" RESOURCE OF HARQ-ACK "1" (PRB, SYMBOL, CS, AND SEQUENCE) | RESOURCE OF HARQ-ACK "0" RESOURCE OF HARQ-ACK "1" (PRB, SYMBOL, CS, AND SEQUENCE) | RESOURCE OF HARQ-ACK "0" RESOURCE OF HARQ-ACK "1" (PRB, SYMBOL, CS, AND SEQUENCE) |
| 10 | RESOURCE OF HARQ-ACK "0" RESOURCE OF HARQ-ACK "1" (PRB, SYMBOL, CS, AND SEQUENCE) | RESOURCE OF HARQ-ACK "0" RESOURCE OF HARQ-ACK "1" (PRB, SYMBOL, CS, AND SEQUENCE) | RESOURCE OF HARQ-ACK "0" RESOURCE OF HARQ-ACK "1" (PRB, SYMBOL, CS, AND SEQUENCE) |
| 11 | RESOURCE OF HARQ-ACK "0" RESOURCE OF HARQ-ACK "1" (PRB, SYMBOL, CS, AND SEQUENCE) | RESOURCE OF HARQ-ACK "0" RESOURCE OF HARQ-ACK "1" (PRB, SYMBOL, CS, AND SEQUENCE) | RESOURCE OF HARQ-ACK "0" RESOURCE OF HARQ-ACK "1" (PRB, SYMBOL, CS, AND SEQUENCE) |

FIG. 7

| SIGNALING FIELD | PUCCH RESOURCE | | |
|---|---|---|---|
| | POSITIVE SR | NEGATIVE SR | NO SR |
| 00 | RESOURCE OF HARQ-ACK "00" RESOURCE OF HARQ-ACK "01" RESOURCE OF HARQ-ACK "11" RESOURCE OF HARQ-ACK "10" (PRB, SYMBOL, CS, AND SEQUENCE) | RESOURCE OF HARQ-ACK "00" RESOURCE OF HARQ-ACK "01" RESOURCE OF HARQ-ACK "11" RESOURCE OF HARQ-ACK "10" (PRB, SYMBOL, CS, AND SEQUENCE) | RESOURCE OF HARQ-ACK "00" RESOURCE OF HARQ-ACK "01" RESOURCE OF HARQ-ACK "11" RESOURCE OF HARQ-ACK "10" (PRB, SYMBOL, CS, AND SEQUENCE) |
| 01 | RESOURCE OF HARQ-ACK "00" RESOURCE OF HARQ-ACK "01" RESOURCE OF HARQ-ACK "11" RESOURCE OF HARQ-ACK "10" (PRB, SYMBOL, CS, AND SEQUENCE) | RESOURCE OF HARQ-ACK "00" RESOURCE OF HARQ-ACK "01" RESOURCE OF HARQ-ACK "11" RESOURCE OF HARQ-ACK "10" (PRB, SYMBOL, CS, AND SEQUENCE) | RESOURCE OF HARQ-ACK "00" RESOURCE OF HARQ-ACK "01" RESOURCE OF HARQ-ACK "11" RESOURCE OF HARQ-ACK "10" (PRB, SYMBOL, CS, AND SEQUENCE) |
| 10 | RESOURCE OF HARQ-ACK "00" RESOURCE OF HARQ-ACK "01" RESOURCE OF HARQ-ACK "11" RESOURCE OF HARQ-ACK "10" (PRB, SYMBOL, CS, AND SEQUENCE) | RESOURCE OF HARQ-ACK "00" RESOURCE OF HARQ-ACK "01" RESOURCE OF HARQ-ACK "11" RESOURCE OF HARQ-ACK "10" (PRB, SYMBOL, CS, AND SEQUENCE) | RESOURCE OF HARQ-ACK "00" RESOURCE OF HARQ-ACK "01" RESOURCE OF HARQ-ACK "11" RESOURCE OF HARQ-ACK "10" (PRB, SYMBOL, CS, AND SEQUENCE) |
| 11 | RESOURCE OF HARQ-ACK "00" RESOURCE OF HARQ-ACK "01" RESOURCE OF HARQ-ACK "11" RESOURCE OF HARQ-ACK "10" (PRB, SYMBOL, CS, AND SEQUENCE) | RESOURCE OF HARQ-ACK "00" RESOURCE OF HARQ-ACK "01" RESOURCE OF HARQ-ACK "11" RESOURCE OF HARQ-ACK "10" (PRB, SYMBOL, CS, AND SEQUENCE) | RESOURCE OF HARQ-ACK "00" RESOURCE OF HARQ-ACK "01" RESOURCE OF HARQ-ACK "11" RESOURCE OF HARQ-ACK "10" (PRB, SYMBOL, CS, AND SEQUENCE) |

FIG. 8

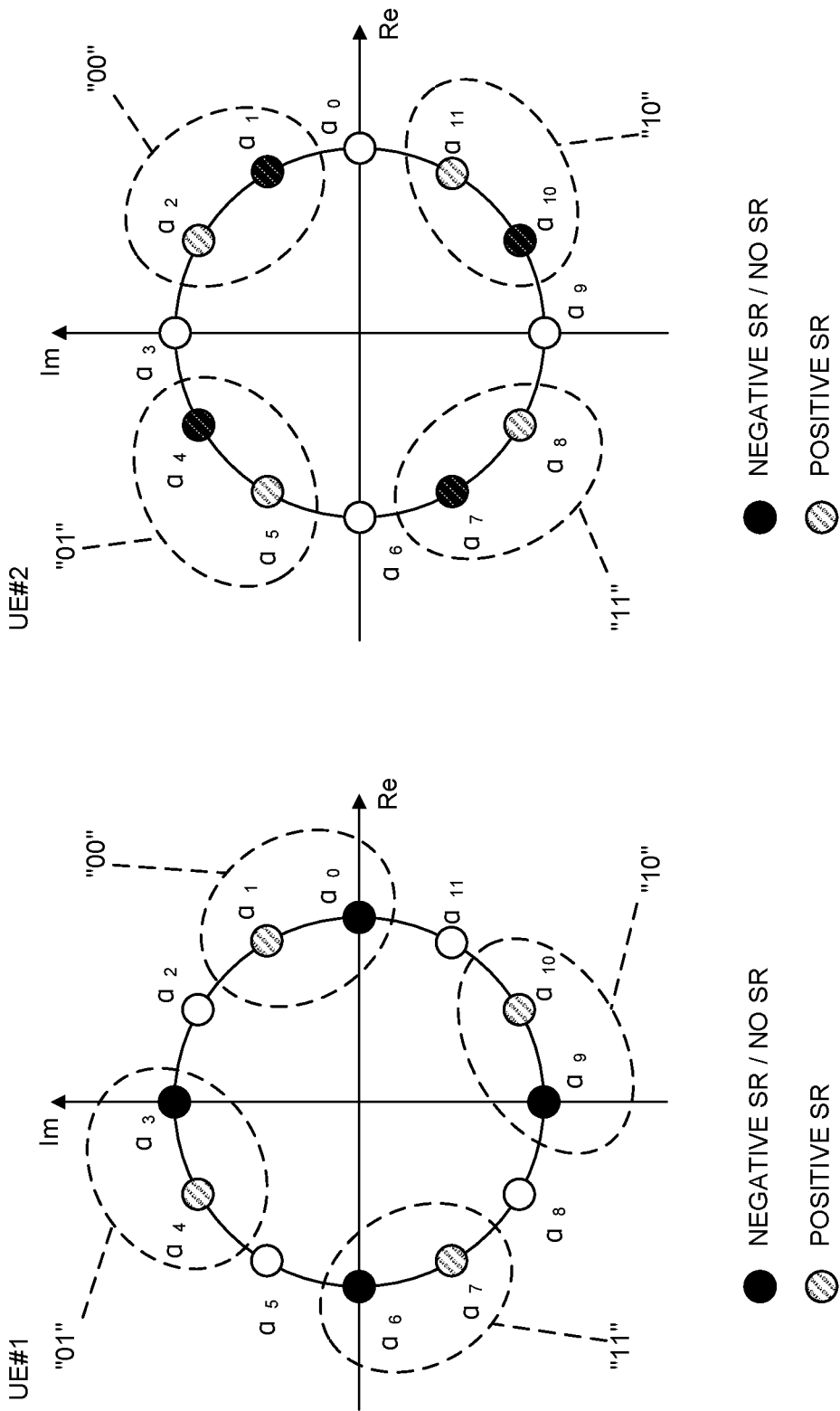

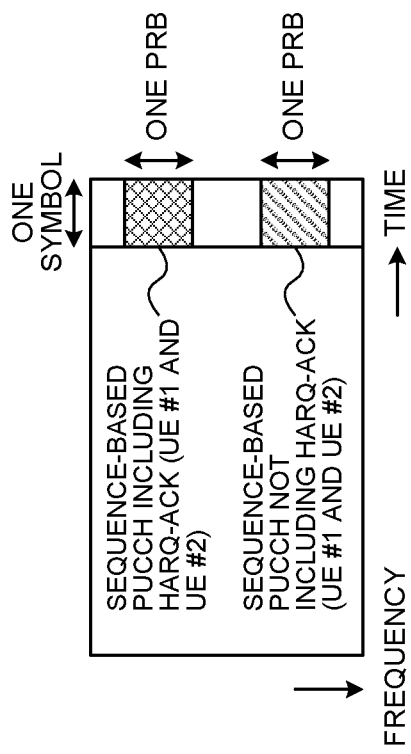
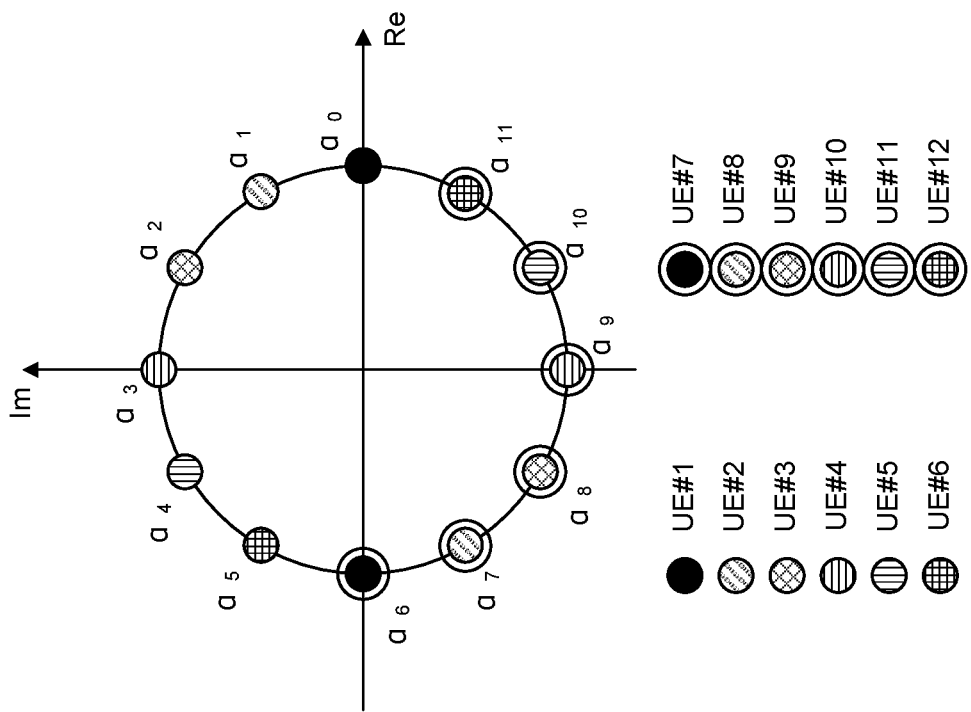
FIG. 10B
FIG. 10A

| SIGNALING FIELD | PUCCH RESOURCE |
|---|---|
| | NEGATIVE SR / NO SR |
| 00 | RESOURCE OF HARQ-ACK SPECIFIC VALUE (PRB, SYMBOL, CS, AND SEQUENCE) |
| 01 | RESOURCE OF HARQ-ACK SPECIFIC VALUE (PRB, SYMBOL, CS, AND SEQUENCE) |
| 10 | RESOURCE OF HARQ-ACK SPECIFIC VALUE (PRB, SYMBOL, CS, AND SEQUENCE) |
| 11 | RESOURCE OF HARQ-ACK SPECIFIC VALUE (PRB, SYMBOL, CS, AND SEQUENCE) |

FIG. 14

| SIGNALING FIELD | PUCCH RESOURCE | |
|---|---|---|
| | NEGATIVE SR / NO SR | |
| 00 | | RESOURCE OF HARQ-ACK "0"<br>RESOURCE OF HARQ-ACK "1"<br>(PRB, SYMBOL, CS, AND SEQUENCE) |
| 01 | | RESOURCE OF HARQ-ACK "0"<br>RESOURCE OF HARQ-ACK "1"<br>(PRB, SYMBOL, CS, AND SEQUENCE) |
| 10 | | RESOURCE OF HARQ-ACK "0"<br>RESOURCE OF HARQ-ACK "1"<br>(PRB, SYMBOL, CS, AND SEQUENCE) |
| 11 | | RESOURCE OF HARQ-ACK "0"<br>RESOURCE OF HARQ-ACK "1"<br>(PRB, SYMBOL, CS, AND SEQUENCE) |

FIG. 15

| SIGNALING FIELD | PUCCH RESOURCE |
| --- | --- |
| | NEGATIVE SR / NO SR |
| 00 | RESOURCE OF HARQ-ACK "00"<br>RESOURCE OF HARQ-ACK "01"<br>RESOURCE OF HARQ-ACK "11"<br>RESOURCE OF HARQ-ACK "10"<br>(PRB, SYMBOL, CS, AND SEQUENCE) |
| 01 | RESOURCE OF HARQ-ACK "00"<br>RESOURCE OF HARQ-ACK "01"<br>RESOURCE OF HARQ-ACK "11"<br>RESOURCE OF HARQ-ACK "10"<br>(PRB, SYMBOL, CS, AND SEQUENCE) |
| 10 | RESOURCE OF HARQ-ACK "00"<br>RESOURCE OF HARQ-ACK "01"<br>RESOURCE OF HARQ-ACK "11"<br>RESOURCE OF HARQ-ACK "10"<br>(PRB, SYMBOL, CS, AND SEQUENCE) |
| 11 | RESOURCE OF HARQ-ACK "00"<br>RESOURCE OF HARQ-ACK "01"<br>RESOURCE OF HARQ-ACK "11"<br>RESOURCE OF HARQ-ACK "10"<br>(PRB, SYMBOL, CS, AND SEQUENCE) |

FIG. 16

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), downlink (DL) and/or uplink (UL) communication are performed using 1-ms subframes (also referred to as "transmission time intervals (TTIs)" and so on). This subframe is the unit of time it takes to transmit one channel-encoded data packet, and is the processing unit in, for example, scheduling, link adaptation, retransmission control (HARQ (Hybrid Automatic Repeat reQuest)) and so on.

Also, in existing LTE systems (for example, LTE Rel. 8 to 13), a user terminal (UE (User Equipment)) transmits uplink control information (UCI) by using a UL control channel (for example, PUCCH (Physical Uplink Control CHannel)) and/or a UL data channel (for example, PUSCH (Physical Uplink Shared CHannel)). The format of this UL control channel is referred to as "PUCCH format" and so on.

UCI includes at least one of a scheduling request (SR), retransmission control information in response to DL data (DL data channel (PDSCH (Physical Downlink Shared CHannel))) (also referred to as "HARQ-ACK (Hybrid Automatic Repeat reQuest-Acknowledgement)," "ACK," "NACK (Negative ACK)" and so on) and channel state information (CSI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) are expected to realize various radio communication services so as to fulfill mutually varying requirements (for example, ultra-high speed, large capacity, ultra-low latency, etc.).

For example, NR is under study to provide radio communication services referred to as "eMBB (enhanced Mobile Broad Band)," "mMTC (massive Machine Type Communication)," "URLLC (Ultra Reliable and Low Latency Communications)," and so on.

Furthermore, in LTE/NR, studies are underway to use UL control channels of various formats (UL control channel formats). When applying UCI transmission methods in existing LTE systems (LTE Rel. 13 or earlier versions) to such future radio communication systems, there is a risk that the coverage, throughput and/or others may deteriorate.

The present invention has been made in view of the above, and it is therefore an object of the present invention to provide a user terminal and a radio communication method, whereby UL control information can be reported properly in future radio communication systems.

Solution to Problem

According to one aspect of the present invention, a user terminal includes a transmission section that transmits a sequence associated with uplink control information, and a control section that controls selection of a radio resource to use to transmit the sequence, based on a radio resource that is associated with identification information signaled from the radio base station, from among a plurality of radio resources that are designated in configuration information signaled from the radio base station.

Advantageous Effects of Invention

According to the present invention, UL control information can be reported properly in future radio communication systems.

BRIEF DESCRIPTION OF DRAWINGS

FIG. 3 is a diagram to show examples of PUCCH resource configuration information for use in the first SR reporting method and the first configuration method, according to a second embodiment of the present invention;

FIG. 4 is a diagram to show examples of PUCCH resource configuration information for use in the first SR reporting method and the second configuration method when the HARQ-ACK information is one bit, according to the second embodiment;

FIG. 5 is a diagram to show examples of PUCCH resource configuration information for use in the first SR reporting method and the second configuration method when the HARQ-ACK information is two bits, according to the second embodiment;

FIG. 6 is a diagram to show examples of PUCCH resource configuration information for use in the second SR reporting method and the first configuration method according to the second embodiment;

FIG. 7 is a diagram to show examples of PUCCH resource configuration information for use in the second SR reporting method and the second configuration method when the HARQ-ACK information is one bit, according to the second embodiment;

FIG. 8 is a diagram to show examples of PUCCH resource configuration information for use in the second SR reporting method and the second configuration method when the HARQ-ACK information is two bits, according to the second embodiment;

FIGS. 9A and 9B are diagrams to show examples of CS candidate sets assigned to each UE in the first SR reporting method;

FIGS. 10A and 10B are diagrams to show examples of CS candidate sets and frequency resources for UCI that only includes SRs;

FIG. 14 is a diagram to show examples of PUCCH resource configuration information for use in the first SR reporting method and the first configuration method, according to a third embodiment of the present invention;

FIG. 15 is a diagram to show examples of PUCCH resource configuration information for use in the first SR reporting method and the second configuration method when the HARQ-ACK information is one bit, according to the third embodiment;

FIG. 16 is a diagram to show examples of PUCCH resource configuration information for use in the first SR reporting method and the second configuration method when the HARQ-ACK information is two bits, according to the third embodiment;

DESCRIPTION OF EMBODIMENTS

Figure 1B:
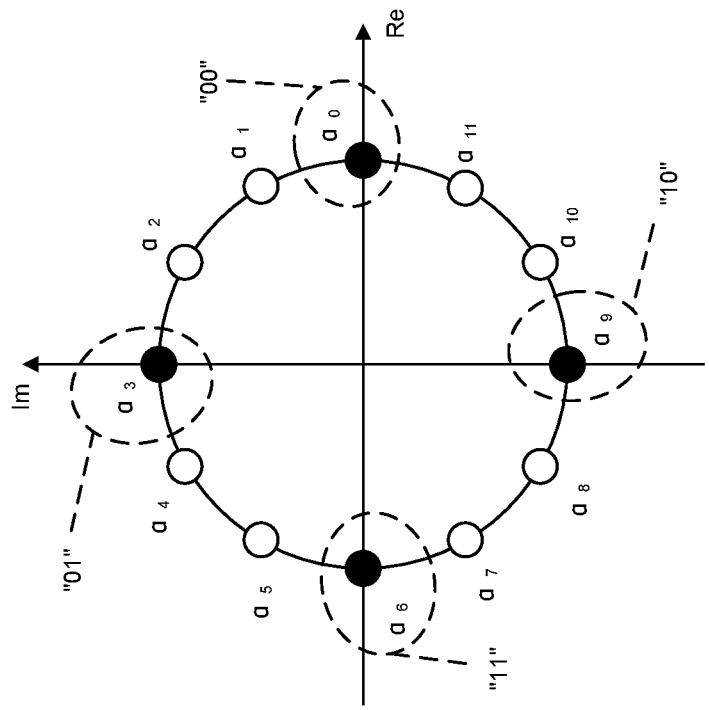
FIGS. 1A and 1B are diagrams to show examples of sequence-based PUCCHs.

Future radio communication systems (for example, LTE Rel. 14, 15 and/or later versions, 5G, NR, etc.) are under study to introduce multiple numerologies, not a single numerology.

Note that numerology may refer to a set of communication parameters that characterize the design of signals in a given RAT (Radio Access Technology), the design of the RAT and so on, or refer to parameters that relate to the frequency direction and/or the time direction, such as sub-carrier spacing (SCS), symbol duration, cyclic prefix duration, subframe duration and so on.

Also, future radio communication systems are being studied to introduce time units (also referred to as "subframes," "slots," "minislots," "subslots," "transmission time intervals (TTIs)," "short TTIs (sTTI)" "radio frames" and so on) that are the same and/or different than existing LTE systems (LTE Rel. 13 or earlier versions), while supporting multiple numerologies and so on.

Note that TTIs may represent time units in which transport blocks, code blocks and/or codewords of transmitting/receiving data are transmitted and received. When a TTI is provided, the period of time (for example, the number of symbols) where a transport block, a code block and/or a codeword of data is actually mapped may be shorter than the TTI.

For example, when a given number of symbols (for example, fourteen symbols) constitute a TTI, transmitting/receiving data's transport block, code block and/or codeword can be transmitted and received in a period of one or a given number of symbols in the constituent symbols. If the number of symbols in which a transport block, a code block and/or a codeword of transmitting/receiving data is transmitted and/or received is smaller than the number of symbols constituting a TTI, reference signals, control signals and/or others can be mapped to symbols in the TTI where no data is mapped.

Subframes may serve as time units that have a given time duration (for example, 1 ms), irrespective of which numerology is used by (and/or configured in) a user terminal (for example, UE (User Equipment)).

By contrast with this, slots may serve as time units that depend on the numerology UE uses. For example, if the subcarrier spacing is 15 kHz or 30 kHz, the number of symbols per slot may be seven or fourteen. When the subcarrier spacing is 60 kHz or greater, the number of symbols per slot may be fourteen. In addition, a slot may contain a number of minislots.

For such future radio communication systems, a study is in progress to support a UL control channel (hereinafter also referred to as a "short PUCCH") that is structured to be shorter in duration than PUCCH (Physical Uplink Control CHannel) formats for existing LTE systems (for example, LTE Rel. 8 to 13) and/or a UL control channel (hereinafter also referred to as a "long PUCCH") that is structured to have a longer duration than the above short duration.

A short PUCCH (also referred to as a "shortened PUCCH") is formed with a given number of symbols (for example, one symbol, two symbols, or three symbols) provided in a given SCS. In this short PUCCH, uplink control information (UCI) and reference signals (RSs) may be time-division-multiplexed (TDM) or frequency-division-multiplexed (FDM). The RSs may be, for example, the demodulation reference signal (DMRS), which is used to demodulate UCI.

The SCS for each symbol of the short PUCCH may be the same as or higher than the SCS for symbols of data channels (hereinafter also referred to as "data symbols"). The data channels may be, for example, a downlink data channel (PDSCH (Physical Downlink Shared CHannel)), an uplink data channel (PUSCH (Physical Uplink Shared CHannel)) and so on.

Hereinafter, whenever "PUCCH" is simply mentioned, this may be read as "short PUCCH" or "PUCCH in short duration."

PUCCH may be time-division-multiplexed (TDM) and/or frequency-division-multiplexed (FDM) with a UL data channel (hereinafter also referred to as "PUSCH") in the slot. Also, the PUCCH may be time-division-multiplexed (TDM) and/or frequency-division-multiplexed (FDM) with a DL data channel (hereinafter also referred to as "PDSCH") and/or a DL control channel (hereinafter also referred to as "PDCCH (Physical Downlink Control CHannel)") within the slot.

To provide schemes for transmitting short PUCCHs, a DMRS-based PUCCH (DMRS-based transmission or DMRS-based PUCCH), which reports UCI by transmitting UL signals, in which DMRS and UCI are frequency-division-multiplexed (FDM) and/or time-division-multiplexed (TDM), and a sequence-based PUCCH (or sequence-based transmission), which reports UCI by transmitting UL signals using code resources that are associated with UCI values, without using DMRS, are under study.

A DMRS-based PUCCH transmits a PUCCH that contains the RS for demodulating UCI, and therefore may be referred to as "coherent transmission," "coherent design," and so on. A sequence-based PUCCH reports UCI in a PUCCH that does not contain the RS for demodulating UCI, and therefore may be referred to as "non-coherent transmission," "non-coherent design" and so on.

Given that a short PUCCH of one symbol, which is for use for UCI up to two bits, a study is in progress to map a sequence having a sequence length of 12, to 12 successive REs (Resource Elements) in PRBs (Physical Resource Blocks). Sequences of sequence length 24 or 48 may be used as well. A sequence-based PUCCH and other sequences may be multiplexed by CDM (Code Division Multiplexing) or FDM.

Code resources for sequence-based PUCCHs may be resources that can be code-division-multiplexed, and at least one of base sequences, amounts of cyclic shifts (amounts of phase rotations) and OCCs (Orthogonal Cover Codes) may be used. A cyclic shift may be read as a phase rotation.

Information to represent at least one of time resources, frequency resources and code resources for a sequence-based PUCCH may be signaled from the network (NW, which is, for example, a radio base station, a gNodeB, etc.) to UE via higher layer signaling (for example, RRC (Radio Resource Control) signaling, MAC (Medium Access Control) signaling, broadcast information (the MIB (Master Information Block), SIBs (System Information Blocks), etc.), physical layer signaling (for example, DCI) or a combination of these.

Base sequences may be CAZAC (Constant Amplitude Zero Auto-Correlation) sequences (for example, Zadoff-Chu sequences), or may be sequences that are equivalent to CAZAC sequences (for example, CG-CAZAC (Computer-Generated CAZAC) sequences), such as ones specified in 3GPP TS 36.211 § 5.5.1.2 (in particular, table 5.5.1.2-1 and table 5.5.1.2-2). The number of base sequences is, for example, 30.

A case will be described here in which a sequence-based PUCCH transmits two-bit UCI using cyclic shift (CS)). CS can be equally interpreted as the amount of phase rotation, and therefore "the amount of phase rotation" will be used hereinafter interchangeably. Multiple candidates of CS (CS candidates) that are assigned to one UE are referred to as a "CS candidate set" (also referred to as a "cyclic shift amount set," a "cyclic shift amount pattern," a "phase rotation amount candidate set," a "phase rotation amount pattern," etc.).

Figure 1A:
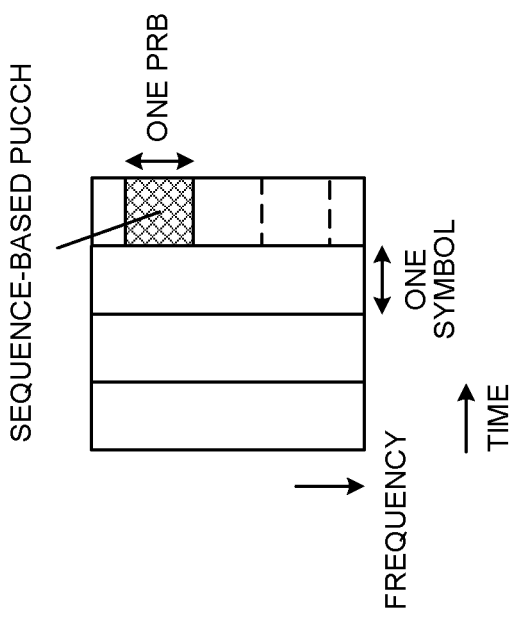

The sequence length of base sequence is determined by the number of subcarriers M and the number of PRBs (Physical Resource Blocks). As shown in FIG. 1A, when a sequence-based PUCCH is transmitted using a band of one PRB, the sequence length of the base sequence is 12 (=12×1). In this case, as shown in FIG. 1B, twelve amounts of phase rotation $\alpha_0$ to $\alpha_{11}$, which are provided at phase intervals of $2\pi/12$ (that is, $\pi/6$) are defined. By applying phase rotations (cyclic shifts) to one base sequence based on amounts of phase rotation $\alpha_0$ to $\alpha_{11}$ individually, twelve sequences that are orthogonal to each other (with zero cross-correlation) are acquired. Note that amounts of phase rotation $a_0$ to $a_{11}$ have only to be determined based on at least one of the number of subcarriers M, the number of PRBs and the sequence length of the base sequence. The CS candidate set may consist of two or more amounts of phase rotation, selected from amounts of phase rotation (cyclic shifts) $a_0$ to $a_{11}$. These indices 0 to 11 of amounts of phase rotation may be referred to as "CS (Cyclic Shift) indices."

The sequence-based PUCCH reports UCI, which includes at least one of an HARQ-ACK (ACK/NACK, A/N), CSI and an SR.

For example, when the UCI is one bit to represent an HARQ-ACK, the UCI values 0 and 1 may correspond to a "NACK" (Negative ACKnowledgment) and an "ACK" (positive ACKnowledgment), respectively. For example, when the UCI is two bits representing an HARQ-ACK, the UCI values 00, 01, 11 and 10 may correspond to a "NACK-NACK," a "NACK-ACK," an "ACK-ACK" and an "ACK-NACK," respectively.

For example, when the UCI is two bits, as shown in FIG. 1B, the UE, given four candidates (UCI candidates, candidate values, etc.) for the two-bit UCI, rotates the phase of a base sequence by selecting an amount of phase rotation that corresponds to the value to be transmitted, and transmits the phase-rotated signal using the time/frequency resource that is allocated. The time/frequency resource may be a time resource (for example, a subframe, a slot, a symbol, etc.) and/or a frequency resource (for example, a carrier frequency, a channel band, a CC (Component Carrier), a PRB, etc.).

FIGS. 2A to 2D provide diagrams to show examples of transmission signal generation processes for sequence-based PUCCHs. In these transmission signal generation processes, phase rotations (cyclic shifts) are applied to base sequences X0 to XM−1 of sequence length M, based on selected amounts of phase rotation $\alpha$, and the phase-rotated base sequences are input to a CP-OFDM (Cyclic Prefix-Orthogonal Frequency Division Multiplexing) transmitter or a DFT-S-OFDM (Discrete Fourier Transform-Spread-Orthogonal Frequency Division Multiplexing) transmitter. The UE transmits output signals from the CP-OFDM transmitter or the DFT-S-OFDM transmitter.

Figure 2A:
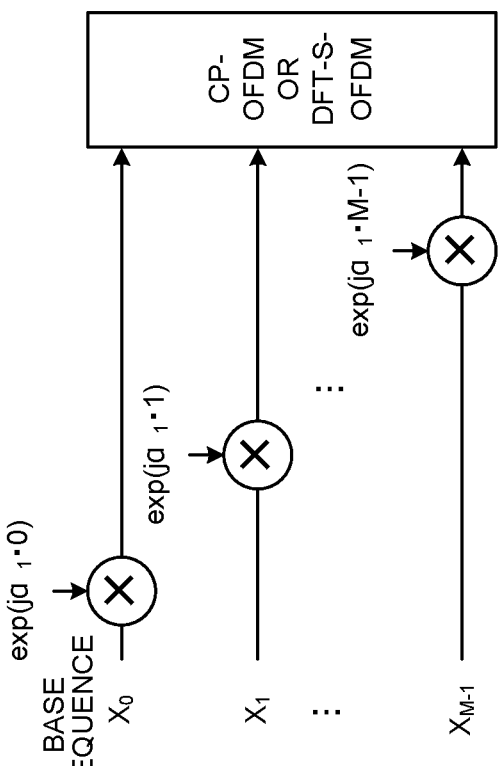
FIGS. 2A to 2D are diagrams to show examples of transmission signal generation processes for sequence-based PUCCHs.
Figure 2B:
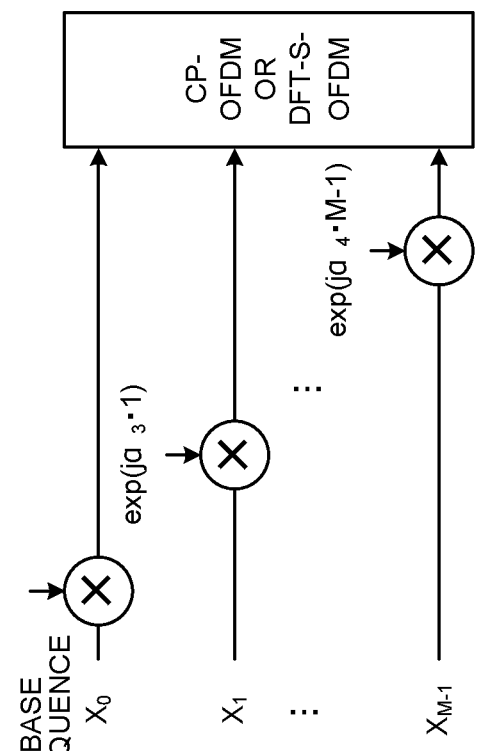
Figure 2C:
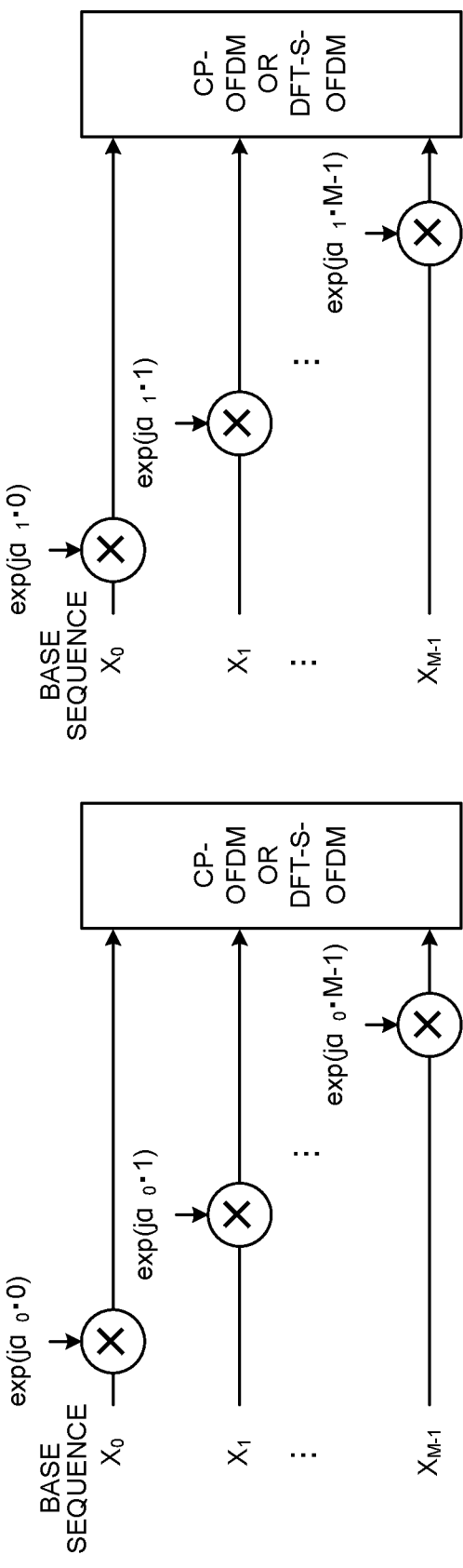
Figure 2D:
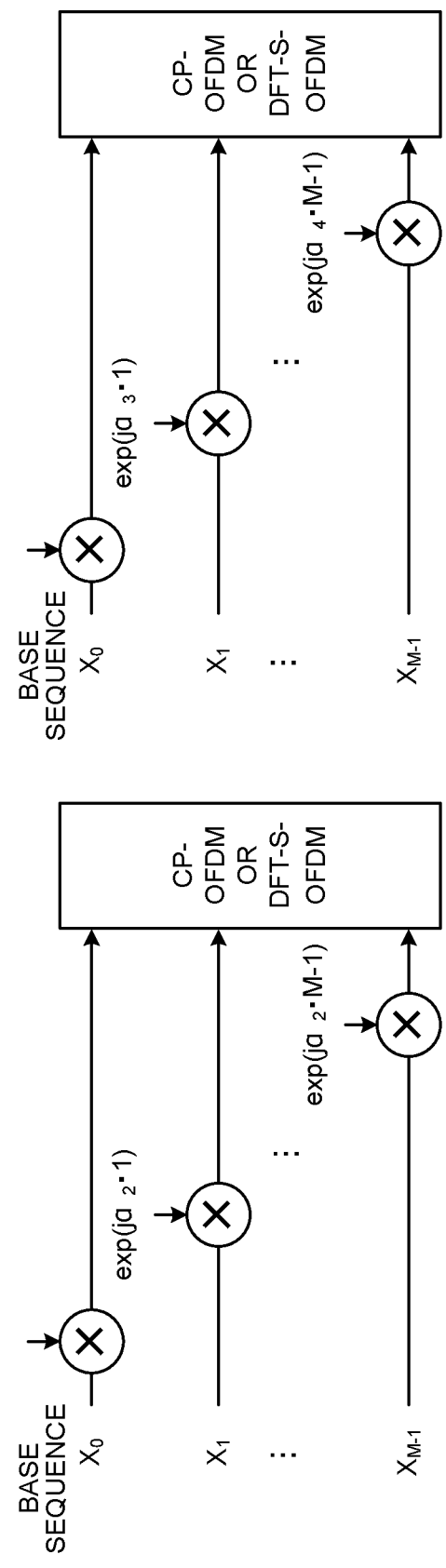

When amounts of phase rotation $\alpha_0$ to $\alpha_3$ in the CS candidate set are associated with UCI candidates 0 to 3, respectively, and value 0 is reported as UCI, as shown in FIG. 2A, the UE applies phase rotations to base sequences $X_0$ to $X_{M-1}$, using amount of phase rotation $\alpha_0$, which is associated with value 0. Similarly, when the UE reports values 1 to 3 as UCI, as shown in FIGS. 2B, 2C and 2D, the UE applies phase rotations to base sequences $X_0$ to $X_{M-1}$ by using amounts of phase rotation $\alpha_1 1$, $\alpha_2$ and $\alpha_3$, which are associated with values 1 to 3, respectively.

Next, the decoding of UCI that is reported in a sequence-based PUCCH will be described. Here, although the receipt detection operation to be carried out when UCI is reported by selecting the amount of phase rotation will be described below, the same operation will hold even when UCI is reported by selecting different types of resources (for example, base sequences, time/frequency resources, etc.) or combinations of multiple types of resources.

The NW may detect UCI from a received signal by using maximum likelihood detection (which may be referred to as "MLD" or "correlation detection"). To be more specific, the network may generate replicas of all amounts of phase rotation (phase rotation amount replicas) assigned to the user terminal (for example, the network may generate four patterns of phase rotation amount replicas if the length of the UCI payload is two bits), and generate transmission signal waveforms, as the user terminal does, based on the base sequences and the phase rotation amount replicas. Also, the network may calculate the correlation between the transmission signal waveforms produced thus, and the waveform of the received signal from the user terminal, for all the phase rotation amount replicas, and assume that the phase rotation amount replica to show the highest correlation has been transmitted.

To be more specific, the network may multiply each element of received signal sequences of size M after the DFT (M complex-number sequences) by complex conjugates of transmission signal sequences (M complex-number sequences), which are given by applying phase rotation to the base sequence of the transmission signal based on phase rotation amount replicas, and assume that the phase rotation amount replica, where the absolute value (or the square of the absolute values) of the sum of the M sequences acquired is the largest, has been sent.

Alternatively, the network may generate transmission signal replicas to match the maximum number of amounts of phase rotation that can be assigned (twelve for one PRB), and estimate the amount of phase rotation to yield the highest correlation with the received signal, based on the same operation as the MLD-based operation described above. If the estimated amount of phase rotation is different from the ones assigned, the network may assume that the amount of phase rotation that is closest to the estimated amount of phase rotation, among the assigned amounts of phase rotation, has been transmitted.

Also, a study is underway to report an HARQ-ACK and an SR, up to two bits, in a sequence-based PUCCH. In this case, a number of resources, which are associated with a number of candidates of UCI to be reported in the sequence-based PUCCH, need to be configured from the NW to UE, the problem lies in how to configure the resources. So the present inventors have worked on a method for configuring resources for a sequence-based PUCCH that reports an HARQ-ACK and an SR, and arrived at the present invention.

Hereinafter, transmission (reporting) of UCI may be read as transmission of sequence-based PUCCH.

Now, embodiments of the present invention will be described in detail below with reference to the accompanying drawings. Note that the radio communication methods according to these embodiments may be applied individually or may be applied in combination.

(Radio Communication Method)

First Embodiment

With a first embodiment of the present invention, a method of configuring a PUCCH resource for a sequence-based PUCCH and a method of configuring the PUCCH resource in UE will be described.

The PUCCH resource may refer to at least one of a time resource, a frequency resource and a code resource.

The time resource may be at least one symbol. The time resource may be represented by a slot index, a mini-slot index, and a symbol index within a slot or a mini-slot.

The frequency resource may be represented by, for example, a PRB index in the allocated UL BWP (Bandwidth Part, partial bandwidth, etc.). The frequency resource may be at least one PRB. If the frequency resource is greater than one PRB, the frequency resource may be specified by the first PRB index and the number of PRBs, or may be specified by the first PRB index and the last PRB index.

Envisaging future radio communication systems (for example, NR, 5G or 5G+), studies are in progress to assign a carrier (component carriers (CCs)) or a system band over a wider bandwidth (for example 100 to 400 MHz) than in existing LTE systems (for example, LTE Rel. 8 to 13). In addition, research is underway to configure one or more frequency bands within this carrier in a user terminal semi-statically. Each frequency band within a carrier is also referred to as a "BWP." A BWP for UL may be referred to as a "UL BWP."

The code resource may be a CS and/or a base sequence. The code resource may be specified by at least one of a CS index and a sequence index to specify a base sequence. Multiple UEs' sequence-based PUCCHs can be code-division-multiplexed (CDM) by allocating different code resources to different UEs, so that the spectral efficiency can be improved.

The indices, numbers, indicators and so on that specify resources are interchangeable.

The number of CS indices that can be used for a sequence-based PUCCH may be limited. That is, fewer than twelve CSs may be assigned to UE for a sequence-based PUCCH of one PRB.

As for the method of configuring PUCCH resources, the following first configuration method or second configuration method may be used.

In the first configuration method, where there are a number of UCI candidates, the NW signals PUCCH resources that are associated with at least one specific UCI candidate, to UE, and the UE selects PUCCH resources that are associated with another UCI candidate, among the multiple UCI candidates, based on the PUCCH resources associated with the specific UCI candidate. For example, the UE may, using an index that specifies a particular type of PUCCH resource for a particular UCI candidate, and a preconfigured algorithm, selects an index that specifies a particular type of PUCCH resource for another UCI candidate.

The UCI includes HARQ-ACK information and/or SR information.

The HARQ-ACK information, which is one bit, represents 0 (NACK) or 1 (ACK). The one-bit HARQ-ACK information represents one of 00 (NACK-NACK), 01 (NACK-ACK), 11 (ACK-ACK), and 10 (ACK-NACK).

The SR information specifies between a positive SR and a negative SR. UCI that includes no SR information points to a non-SR transmission timing (non-SR). UCI that includes a positive SR may indicate that an SR is present at an SR transmission timing, and may be referred to as "SR-including UCI." UCI that includes a negative SR indicates that there is no SR at an SR transmission timing. UCI that includes no SR information indicates that no SR transmission timing is provided then. UCI that includes negative SRs and UCI that includes no SR information may be referred to as "UCI including no SR."

A specific UCI candidate may be a specific value of HARQ-ACK information or a specific value of SR information, may be UCI to include a specific value of SR information and a specific value of HARQ-ACK information. When the HARQ-ACK information is one bit, the specific value may be 0 (NACK). When the HARQ-ACK information is two bits, the specific value may be 00 (NACK-NACK).

Of PUCCH resources, CS candidates that are provided at equal intervals may constitute a CS candidate set. For example, as shown in FIG. 1B, amounts of phase rotation, which correspond to CS candidates, may be provided at intervals of 2π/the number of CS candidates in the CS candidate set (the number of candidates for HARQ-ACK information).

By using this CS candidate set, the phase of a specific RE stays constant irrespective of UCI (HARQ-ACK information). The NW can perform channel estimation using the signal of the specific RE. That is, the NW can use the specific RE's signal as the DMRS (Demodulation Reference Signal). The NW may demodulate UCI based on the result of channel estimation. By using this set of CS candidates, it is possible to configure the receiver flexibly in the NW.

For example, the NW may demodulate UCI based on MLD, which has been mentioned earlier, or demodulate UCI based on the result of channel estimation using the DMRS of a specific RE, or demodulate UCI by combining these. In addition, the NW may estimate the variance of noise using a specific RE.

Also, by using a set of evenly-spaced CS candidates, the UE can readily determine CS candidates for other UCI candidates from CS candidates for a specific UCI candidate. For example, the UE can determine other CS indices by adding the intervals between CS indices, one by one, to the CS index for a particular UCI candidate.

According to the second configuration method, the NW signals a number of PUCCH resources, which are associated with a number of UCI candidates, respectively.

In each configuration method, resources may be signaled through higher layer signaling (for example, RRC signaling and/or broadcast information) and/or physical layer signaling (for example, DCI (downlink control information)).

Each configuration method may configure PUCCH resources of all types (for example, time resources, frequency resources, code resources, etc.). In addition, in each configuration method, only some types of PUCCH resources may be configured, and other types of PUCCH resources may be configured separately. Other types of PUCCH resource may be common among cells. In this case, the NW may configure PUCCH resources in UEs in a cell by using cell-common information (for example, broadcast information).

According to the first configuration method, the NW signals only PUCCH resources that are associated with part of multiple UCI candidates, to UEs, so that the overhead of signaling can be reduced, compared to the second configuration method.

According to the second configuration method, the NW signals a number of PUCCH resources, which are associated with a number of UCI candidates, respectively, to UEs, so that the NW can configure PUCCH resources flexibly.

Second Embodiment

According to a second embodiment of the present invention, the NW signals the PUCCH resource for UCI that includes a positive SR and the PUCCH resource for a UCI that includes a negative SR, to UEs.

The NW may signal PUCCH resource configuration information, which designates a number of PUCCH resources, through higher layer signaling, and signal or specify the PUCCH resources in the PUCCH resource configuration information through physical layer signaling. According to this signaling method, the overhead associated with signaling of PUCCH resources can be reduced, so that PUCCH resources can be changed dynamically.

In the PUCCH resource configuration information, the PUCCH resources may be specified by using at least one of PRB indices, symbol indices, sequence indices and CS indices. When the PUCCH resource configuration information specifies some types among multiple types of PUCCH resources, the NW may signal resource information that designates types of resources that are not included in the PUCCH resource configuration information, to UE, through higher layer signaling (for example, RRC signaling and/or broadcast information).

The resource information may be cell-common. In this case, the NW may signal part of the PUCCH resources to UEs in a cell by using information that is common in the cell (for example, broadcast information). For example, the resource information may be information other than CS indices. By configuring CS indices in a UE-specific manner and configuring other PUCCH resources in a cell-common way, it is possible to multiplex UEs in the same time resource and frequency resource.

Since resource information that is common to a number of UEs is used, it is possible to reduce the volume of PUCCH resources, and reduce the overhead pertaining to signaling of PUCCH resources.

The NW may determine different SR transmission timings for each UE, and signal information that indicates the SR transmission timings, via higher layer signaling. This information to specify SR transmission timings may contain the periodicity of SRs, SR offsets (offsets of time resources such as subframes, slots and so on) and so on. At periodic SR transmission timings, the UE transmits a UCI that includes a positive SR or a negative SR, to the NW. At periodic SR transmission timings, the UE transmits UCI including SR information (a positive SR or a negative SR), to the NW.

If a timing that is an SR transmission timing and is also an HARQ-ACK transmission timing arrives, the UE reports UCI that includes SR information and HARQ-ACK information, to the NW.

If a timing that is an SR transmission but not an HARQ-ACK transmission timing arrives, the UE reports UCI that includes SR information but does not include HARQ-ACK information ("SR-only," which is UCI that includes SR information alone), to the NW.

If a timing that is not an SR transmission timing but is an HARQ-ACK transmission timing arrives, the UE may report UCI that includes a negative SR, to the NW. In other words, UCI that does not include SR information ("no-SR," which is UCI to include HARQ-ACK information alone, UCI to specify a non-SR transmission timing, and so on) and UCI that includes a negative SR may use the same PUCCH resources. This method of reporting SRs will be hereinafter referred to as the "first SR reporting method."

At a timing that is not an SR transmission timing but is an HARQ-ACK transmission timing, the UE may report UCI not including SR information to the NW. In other words, the PUCCH resources for UCI that does not include SR information may be different from the PUCCH resources for UCI that includes negative SRs. This method of reporting SRs will be hereinafter referred to as the "second SR reporting method."

(First SR Reporting Method)

A case will be described below, in which UCI not including SR information and UCI that includes a negative SR use the same PUCCH resources. In other words, UCI that includes negative SRs and UCI that includes no SR information are not distinguished, and both are treated as UCI including no SR.

The NW may configure PUCCH resources in UEs according to the first SR reporting method and the first configuration method.

FIG. 3 is a diagram to show examples of PUCCH resource configuration information for use in the first SR reporting method and the first configuration method, according to the second embodiment.

The NW may specify one PUCCH resource set in the PUCCH resource configuration information, by using a signaling field provided in DCI. The signaling field is a bit sequence of a given length. For the signaling field, TPC (Transmission Power Control) may be used, or ARI (ACK/NACK Resource Indicator) may be used. Although a case will be described below in which the length of the signaling field is two bits, the signaling field's length needs not be two bits.

The PUCCH resource configuration information specifies a number of PUCCH resources that are associated with a number of signaling field values, respectively.

If the signaling field is a TPC command, since no TPC command corresponds to UCI that includes SR information alone, the PUCCH resource configuration information does not have to specify the PUCCH resource for this UCI carrying SR information alone. The NW may signal this PUCCH resource to the UE using UE-specific information (for example, higher layer signaling).

The PUCCH resource configuration information in this drawing specifies, for each signaling field value, the PUCCH resource for UCI that includes a specific value of HARQ-ACK information and a positive SR, and the PUCCH resource for UCI that includes a specific value of HARQ-ACK information and a negative SR.

When the HARQ-ACK information is one bit, the specific value of HARQ-ACK information may be 0 (NACK). When the HARQ-ACK information is two bits, the specific value of HARQ-ACK information may be 00 (NACK-NACK).

The NW may configure PUCCH resources in UEs according to the first SR reporting method and the second configuration method.

FIG. 4 is a diagram to show examples of PUCCH resource configuration information for use in the first SR reporting method and the second configuration method when the HARQ-ACK information is one bit, according to the second embodiment.

The PUCCH resource configuration information in this drawing specifies, for each signaling field value, the PUCCH resources for UCI that includes candidates for HARQ-ACK information (0 and 1) and a positive SR, the PUCCH resources for UCI that includes candidates for a number of pieces of HARQ-ACK information (0 and 1) and a negative SR.

FIG. 5 is a diagram to show examples of PUCCH resource configuration information for use in the first SR reporting method and the second configuration method when the HARQ-ACK information is two bits, according to the second embodiment.

The PUCCH resource configuration information in this drawing specifies, for each signaling field value, the PUCCH resources for UCI that includes candidates for HARQ-ACK information (00, 01, 11 and 10) and a positive SR, and the PUCCH resources for UCI that includes candidates for HARQ-ACK information (00, 01, 11 and 10) and a negative SR.

According to the first SR reporting method, the NW signals the PUCCH resources for UCI that includes positive SRs and the PUCCH resourced for UCI that includes negative SRs to UEs, so that the NW can configure PUCCH resources flexibly.

Also, since the PUCCH resources for UCI not including SR information are the same as the PUCCH resources for UCI that includes negative SRs, the overhead related to signaling of PUCCH resources can be reduced, so that it is possible to reduce the volume of PUCCH resources.

(Second SR Reporting Method)

A case will be described below, in which UCI that does not include SR information and UCI that includes negative SRs use different PUCCH resources. In other words, UCI that includes negative SRs and UCI that includes no SR information are distinguished.

The NW and UEs can use the second SR reporting method and the first configuration method.

FIG. 6 is a diagram to show examples of PUCCH resource configuration information for use in the second SR reporting method and the first configuration method, according to the second embodiment.

The PUCCH resource configuration information in this drawing specifies, for each signaling field value, the PUCCH resource for UCI that includes a specific value of HARQ-ACK information and a positive SR, the PUCCH resource for UCI that includes a specific value of HARQ-ACK information and a negative SR, and the PUCCH resource for UCI that includes a specific value of HARQ-ACK information but does not include SR information.

When the HARQ-ACK information is one bit, the specific value of HARQ-ACK information may be 0 (NACK). When the HARQ-ACK information is two bits, the specific value of HARQ-ACK information may be 00 (NACK-NACK).

The NW and the UE can use the second SR reporting method and the second configuration method.

FIG. 7 is a diagram to show examples of PUCCH resource configuration information for use in the second SR reporting method and the second configuration method when the HARQ-ACK information is one bit, according to the second embodiment.

The PUCCH resource configuration information in this drawing specifies, for each signaling field value, the PUCCH resources for UCI that includes candidates for HARQ-ACK information (0 and 1) and a positive SR, the PUCCH resources for UCI that includes candidates for HARQ-ACK information (0 and 1) and a negative SR, and the PUCCH resources for UCI that includes candidates for HARQ-ACK information (0 and 1) but does not include SR information.

FIG. 8 is a diagram to show examples of PUCCH resource configuration information for use in the second SR reporting method and the second configuration method when the HARQ-ACK information is two bits, according to the second embodiment.

The PUCCH resource configuration information in this drawing specifies, for each signaling field value, the PUCCH resources for UCI that includes candidates for HARQ-ACK information (00, 01, 11 and 10) and a positive SR, the PUCCH resources for UCI that includes candidates for HARQ-ACK information (00, 01, 11 and 10) and a negative SR, and the PUCCH resources for UCI that includes candidates for HARQ-ACK information (00, 01, 11 and 10) but does not include SR information.

Specific examples of the first SR reporting method and the second SR reporting method will be described now.

Here, assumed that the HARQ-ACK information is two bits. Also, a case will be shown here where sequence-based PUCCHs for UE #1 and UE #2 are code-division-multiplexed (CDM) in the same time resource and frequency resource. So, the NW assigns different CS candidate sets to UE #1 and UE #2. Note that the NW may assign different base sequences to UE #1 and UE #2.

FIGS. 9A and 9B provide diagrams to show examples of CS candidate sets assigned to each UE in the first SR reporting method.

As shown in FIG. 9A, for UE #1, CS indices 0, 3, 6 and 9 are assigned to UCI that includes a negative SR and HARQ-ACK information, and CS indices 1, 4, 7 and 10 are assigned to UCI that includes a positive SR and HARQ-ACK information.

As shown in FIG. 9B, for UE #2, CS indices 1, 4, 7 and 10 are assigned to UCI that includes a negative SR and HARQ-ACK information, and CS indices 2, 5, 8 and 11 are assigned to UCI that includes a positive SR and HARQ-ACK information.

The CSI indices for UCI not including SR information are the same as the CSI indices for UCI that includes a negative SR and the HARQ-ACK information.

Here, the CS indices of UE #1 and the CS indices of UE #2 may overlap. For example, as shown in FIGS. 9A and 9B, the CS indices of UE#1 for UCI that includes a positive SR, and the CS indices of UE #2 for UCI that includes a negative SR or UCI that includes no SR information, overlap.

FIGS. 10A and 10B provide diagrams to show examples of CS candidate sets and frequency resources for UCI that includes an SR alone.

As shown in FIG. 10A, where there are UEs #1 to #12, CS indices 0 to 11 are assigned to UCI that include an SR alone. As shown in FIG. 10B, where there are UEs #1 to #12, one PRB is allocated, as a frequency resource, to UCI that includes HARQ-ACK information, and another PRB in the same symbol is allocated to UCI that includes an SR alone. That is, UE #1 and UE #2 use the same time and frequency resources to transmit UCI that includes HARQ-ACK information. Also, since UCI that includes HARQ-ACK information and UCI that does not include HARQ-ACK information use different frequency resources, the same set of CS candidates (code resources) may be assigned.

Note that one PRB may be allocated to UCI that only includes an SR, and two or more PRBs may be allocated to UCI that includes HARQ-ACK information.

Figure 11:
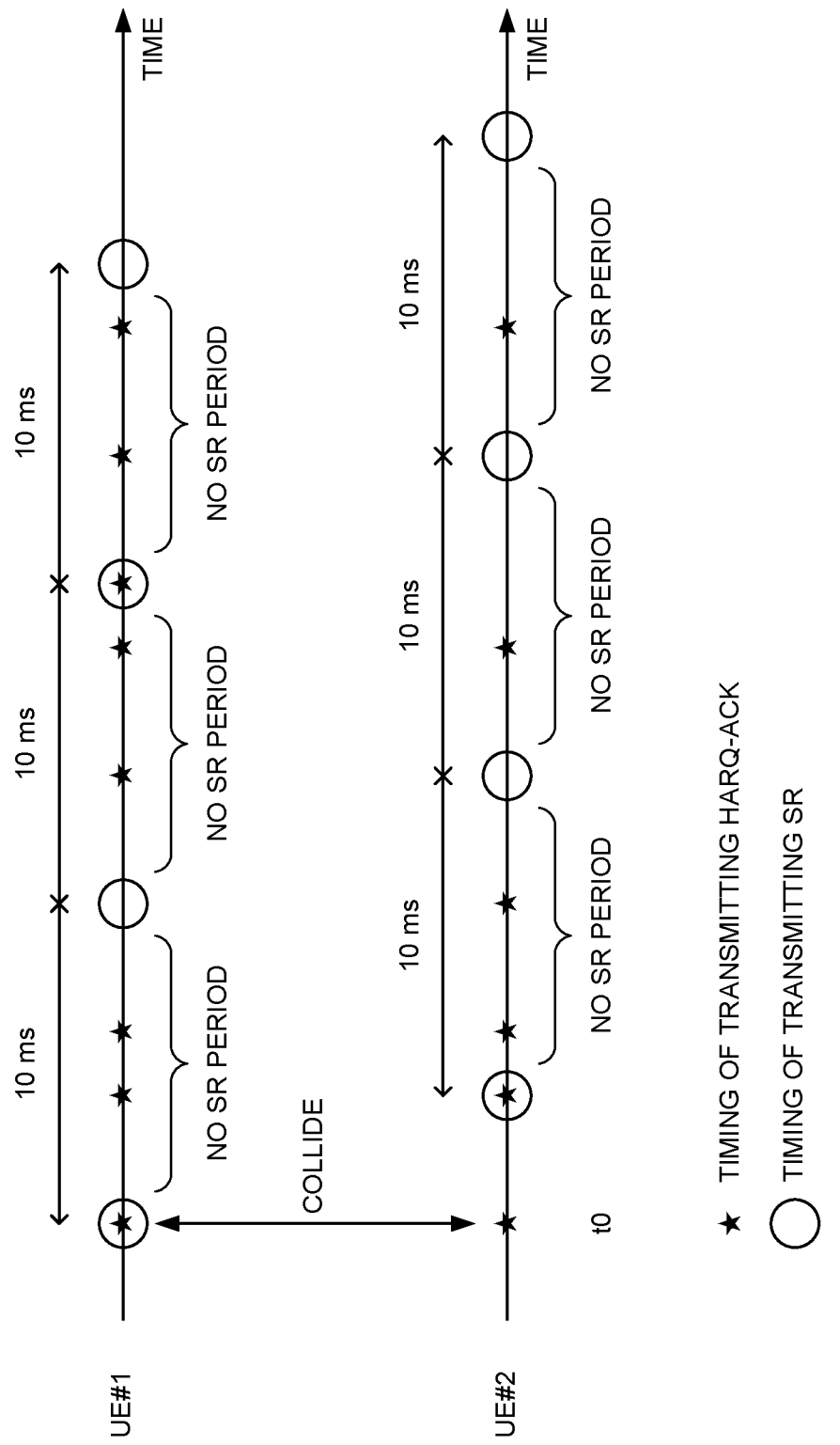
FIG. 11 is a diagram to show examples of timings to transmit UCI when the first SR reporting method is used.

FIG. 11 is a diagram to show examples of timings for transmitting UCI when the first SR reporting method is used.

The NW configures the same SR periodicity and different SR offsets for UE #1 and UE #2. The SR periodicity in the example in this drawing is 10 ms.

When an SR transmission timing is also a timing to transmit an HARQ-ACK, each UE transmits UCI that includes SR information and HARQ-ACK information (SR+HARQ-ACK). In the event an SR transmission timing is not a timing to transmit an HARQ-ACK, each UE transmits UCI that includes SR information alone (SR only).

When an HARQ-ACK transmission timing arrives during a period in which there is no SR transmission timing (non-SR period), each UE transmits UCI that does not include SR information but does include HARQ-ACK information (HARQ-ACK (non-SR)).

At time t0, when UE #1 transmits UCI that includes a positive SR and HARQ-ACK information, and UE #2 transmits UCI including no SR information, as shown in FIGS. 9A and 9B, the CS indices assigned to the UCI of UE #1 that includes a positive SR and HARQ-ACK information and the CS indices assigned to the UCI of UE #2 that does not include SR information are the same, so these UCIs conflict.

Figure 12:
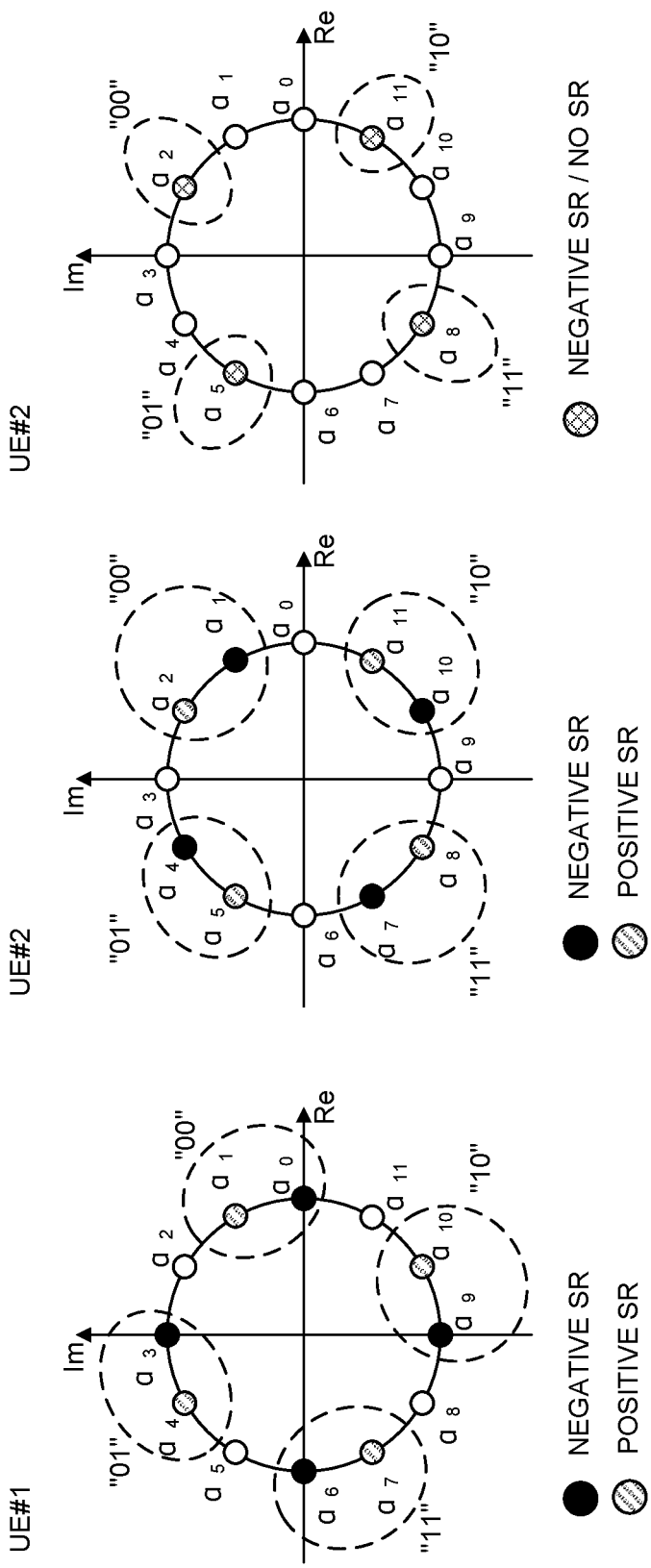
FIGS. 12A to 12C are diagrams to show examples of CS candidate sets assigned to each UE in the first SR reporting method and the second SR reporting method.

FIGS. 12A to 12C provide diagrams to show examples of CS candidate sets assigned to each UE in the first SR reporting method and the second SR reporting method. UE #1 is assigned CS indices in accordance with the first SR reporting method. UE #2 is assigned CS indices in accordance with the second SR reporting method.

As shown in FIG. 12A, for UE #1, as in FIG. 9A, CS indices 0, 3, 6 and 9 are assigned to UCI that includes a negative SR and HARQ-ACK information, and CS indices 1, 4, 7 and 10 are assigned to UCI that includes a positive SR and HARQ-ACK information.

As shown in FIG. 12B, for UE #2, CS indices 1, 4, 7 and 10 are assigned to UCI that includes a negative SR and HARQ-ACK information, and CS indices 2, 5, 8 and 11 are assigned to UCI that includes a positive SR and HARQ-ACK information. Note that, for UE #2, CS indices 1, 4, 7 and 10 may be assigned to UCI that includes a positive SR and HARQ-ACK information, and CS indices 2, 5, 8 and 11 may be assigned to UCI that includes a negative SR and HARQ-ACK information.

As shown in FIG. 12C, for UE #2, furthermore, CS indices 2, 5, 8 and 11 are assigned to UCI that includes no SR information but include HARQ-ACK information.

In UE #2, different CS indices are assigned between UCI that includes negative SRs and UCI that includes no SR information. Also, the same CS indices are assigned to UCI that includes positive SRs and UCI that includes no SR information.

The CS indices for UCI that includes SRs alone and the frequency resources for the sequence-based PUCCHs are the same as in FIGS. 10A and 10B.

Figure 13:
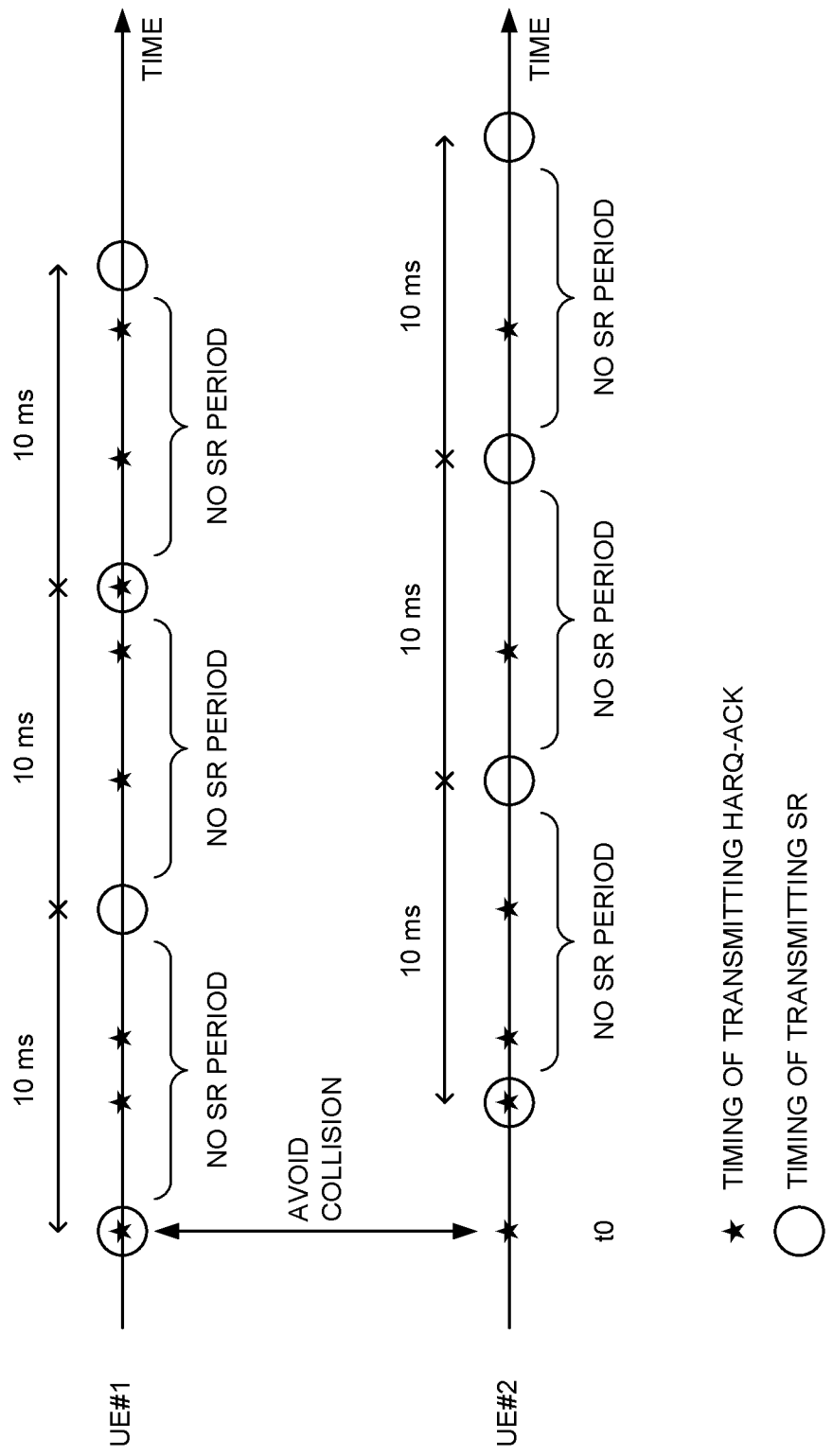
FIG. 13 is a diagram to show examples of timings to transmit UCI when the first SR reporting method and the second SR reporting method are used.

FIG. 13 is a diagram to show examples of timings for transmitting UCI when the first SR reporting method and the second SR reporting method are used.

At time t0, when UE #1 transmits UCI that includes a positive SR and HARQ-ACK information, and UE #2 transmits UCI that does not include SR information, as shown in FIGS. 12A and 12C, the CS indices assigned to the UCI of UE #1 that includes SR information and HARQ-ACK information, and the CS indices assigned to the UCI of UE #2 that does not include SR information are different, so that these UCIs do not collide with each other.

According to the second SR reporting method, the NW signals the PUCCH resources for UCI that includes negative SRs and the PUCCH resources for UCI that does not include SR information, separately, so that, even when a number of UEs transmit UCI that includes SR information and HARQ-ACK information and UCI that includes no SR information by using the same time resource and frequency resource, collisions between CS indices can be prevented.

According to the second embodiment described above, the NW can configure the PUCCH resources associated with UCI that includes positive SRs and the PUCCH resources associated with UCI that includes negative SRs, flexibly.

Third Embodiment

According to a third embodiment of the present invention, the NW signals the PUCCH resource that is associated with UCI candidates that include one value of SR information (a positive SR or a negative SR), to UE, and, based on the PUCCH resource signaled, the UE selects the PUCCH resource that is associated with UCI candidates that include the other value of SR information.

Here, the NW signals the PUCCH resource for UCI that includes a negative SR, to UE, and, based on the PUCCH resource that is signaled, the UE selects the PUCCH resource for UCI that includes a positive SR. Note that the NW signals the PUCCH resource for UCI that includes a positive SR, to the UE, and, based on the PUCCH resource that is signaled, the UE may select the PUCCH resource for UCI that includes a negative SR.

The NW may configure the PUCCH resources in the UE in accordance with the first SR reporting method and the first configuration method.

FIG. 14 is a diagram to show examples of PUCCH resource configuration information for use in the first SR reporting method and the first configuration method, according to the third embodiment.

The PUCCH resource configuration information in this drawing specifies the PUCCH resource for UCI that includes a specific value of HARQ-ACK information and a negative SR, for each signaling field value.

When the HARQ-ACK information is one bit, the specific value of HARQ-ACK information may be 0 (NACK). When the HARQ-ACK information is two bits, the specific value of HARQ-ACK information may be 00 (NACK-NACK).

The UE, using the PUCCH resource for UCI that includes a negative SR and a given algorithm, may select the PUCCH resource for UCI that includes a positive SR. The UE may select a CS index of UCI that includes a positive SR by adding a given offset to a CS index of UCI that includes a negative SR. For example, if n is a CS index for UCI that includes a negative SR and y is an integer that is defined or configured in advance, then, (n+y mod the number of CS indices) gives a CS index of UCI that includes a positive SR. Also, the UE may select a PRB index of UCI that includes a positive SR, by adding a given offset to a PRB index of UCI that includes a negative SR. For example, if n is a PRB index of UCI that includes a negative SR and z is an integer that is defined or configured in advance, then, (n+z mod the number of PRB indices) gives a PRB index of UCI that includes a positive SR. Here, the number of CS/PRB indices may be the number of CS/PRB indices limited by signals/commands from the NW. y and z may be positive or negative.

For PUCCH resources other than CS indices (for example, PRB indices, symbol indices, sequence indices, etc.), the PUCCH resources for UCI that includes positive SRs may be the same as the PUCCH resources for UCI that includes negative SRs.

The NW may configure the PUCCH resources in UEs in accordance with the first SR reporting method and the second configuration method.

FIG. 15 is a diagram to show examples of PUCCH resource configuration information for use in the first SR reporting method and the second configuration method when the HARQ-ACK information is one bit, according to the third embodiment.

The PUCCH resource configuration information in this drawing specifies the PUCCH resources for UCI that includes candidates for HARQ-ACK information (0 and 1) and a negative SR, for each signaling field value.

FIG. 16 is a diagram to show examples of PUCCH resource configuration information for use in the first SR reporting method and the second configuration method when the HARQ-ACK information is two bits, according to the third embodiment.

The PUCCH resource configuration information in this drawing specifies the PUCCH resources for UCI that includes candidates for HARQ-ACK information (00, 01, 11 and 10) and a negative SR, for each signaling field value.

According to the third embodiment described above, the NW signals the PUCCH resources for UCI that includes one of a negative SR and a positive SR to UEs, and does not signal the PUCCH resources for UCI that include the other one to UEs, so that the overhead associated with signaling can be reduced.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 17:
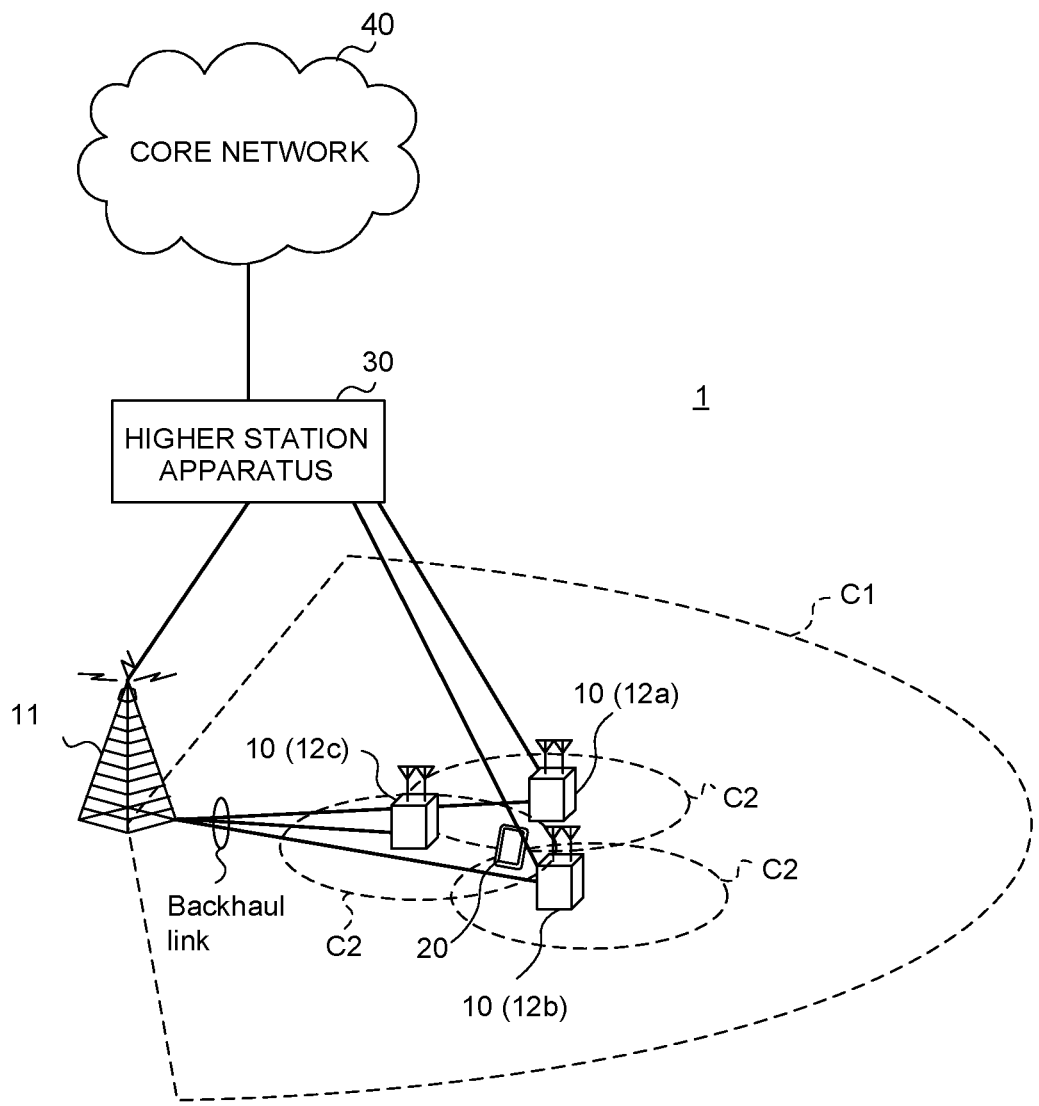
FIG. 17 is a diagram to show an example of a schematic structure of a radio communication system according to one embodiment of the present invention.

FIG. 17 is a diagram to show an example of a schematic structure of a radio communication system according to one embodiment of the present invention. A radio communication system 1 can adopt carrier aggregation (CA) and/or dual connectivity (DC) to group a number of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement, number and so on of cells and user terminals 20 are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a number of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, optical fiber, which is compliance with the CPRI (Common Public Radio Interface), the X2 interface, and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a number of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a number of terminals to use mutually different bands. Note that the radio access schemes for the uplink and the downlink are not limited to this combination, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, is communicated by the PDCCH.

Note that scheduling information may be signaled via DCI. For example, DCI to schedule receipt of DL data may be referred to as "DL assignment," and DCI to schedule transmission of UL data may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 18:
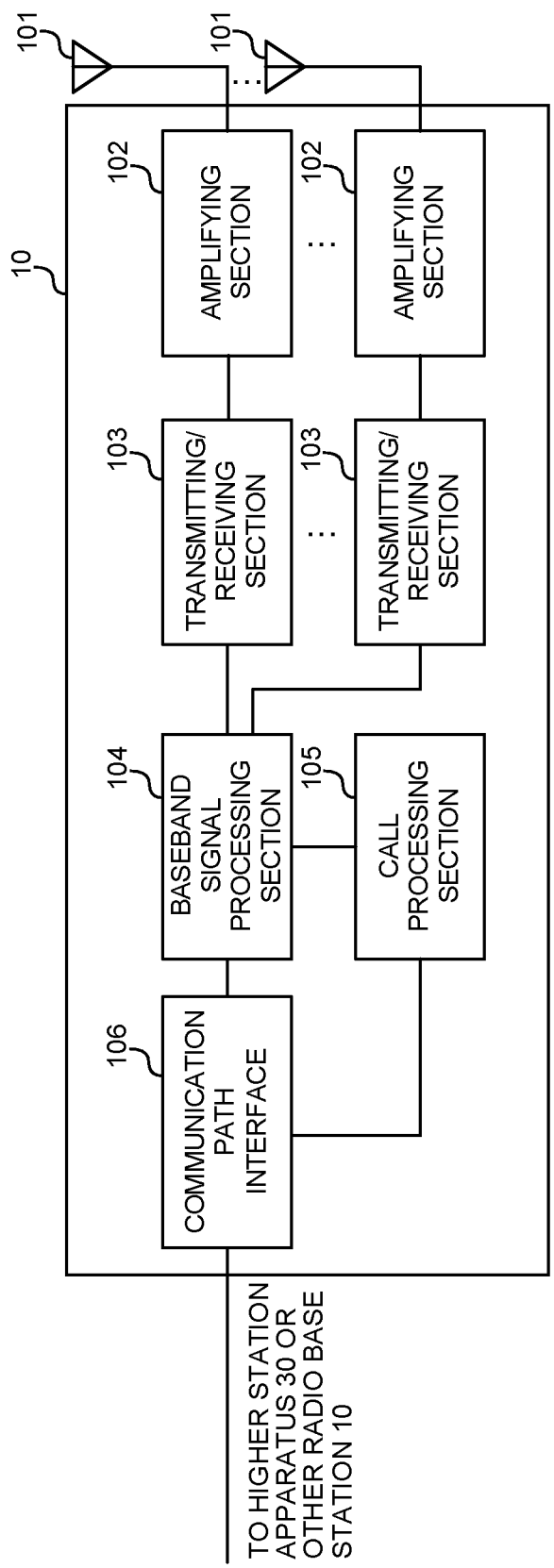
FIG. 18 is a diagram to show an example of an overall structure of a radio base station according to one embodiment of the present invention.

FIG. 18 is a diagram to show an example of an overall structure of a radio base station according to one embodiment of the present invention. A radio base station 10 has a number of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Also, the transmitting/receiving sections 103 may receive sequences (for example, sequence-based PUCCHs) that are associated with uplink control information (UCI).

Also, the transmitting/receiving sections 103 may transmit parameters for sequence-based PUCCHs to the user terminal 20.

Figure 19:
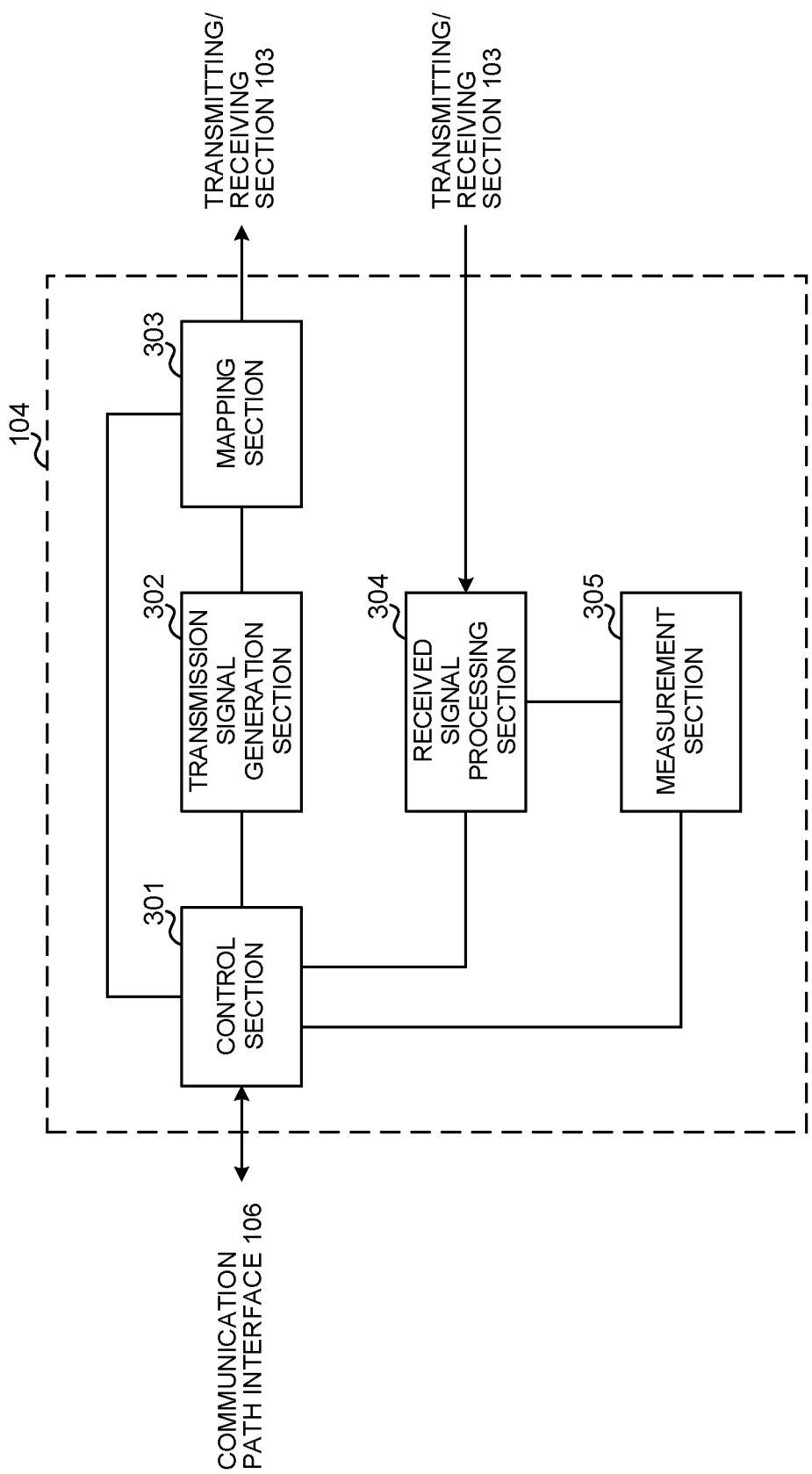
FIG. 19 is a diagram to show an example of a functional structure of a radio base station according to one embodiment of the present invention.

FIG. 19 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgement information). The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals, and/or other signals.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which signal downlink data allocation information, and/or UL grants, which signal uplink data allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

Also, the control section 301 may allocate the radio resources for sequence-based PUCCHs, to user terminals 20. Also, the control section 301 may allocate base sequences, CSs (CS candidate sets) and so on for sequence-based PUCCHs, to user terminals 20.

(User Terminal)

Figure 20:
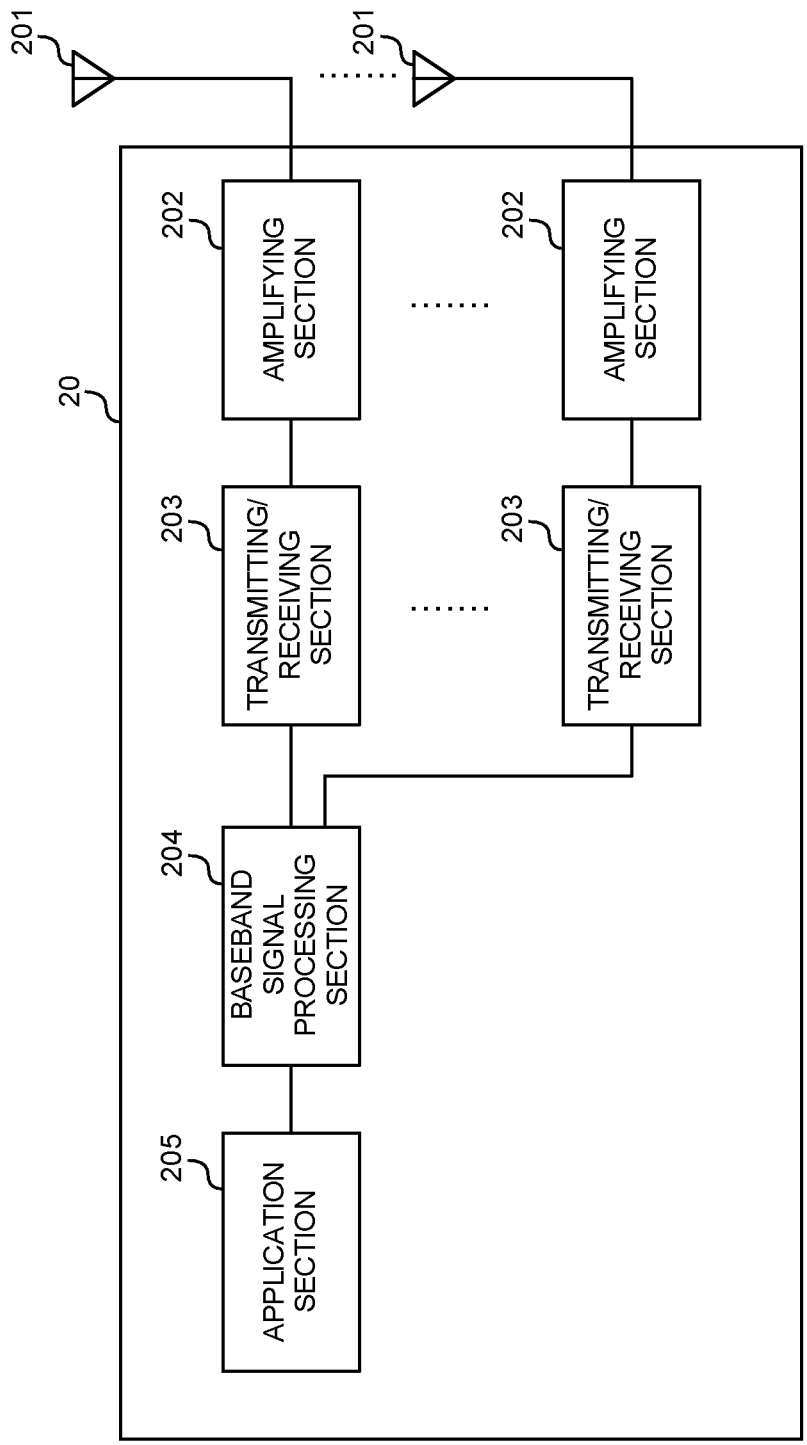
FIG. 20 is a diagram to show an example of an overall structure of a user terminal according to one embodiment of the present invention.

FIG. 20 is a diagram to show an example of an overall structure of a user terminal according to one embodiment of the present invention. A user terminal 20 has a number of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may transmit sequences (for example, sequence-based PUCCHs) that are associated with uplink control information (UCI).

Also, the transmitting/receiving sections 203 may receive, from the radio base station 10, parameters that specify the PUCCH resources for sequence-based PUCCHs (for example, at least one of PUCCH resource configuration information, resource information and the signaling field).

Figure 21:
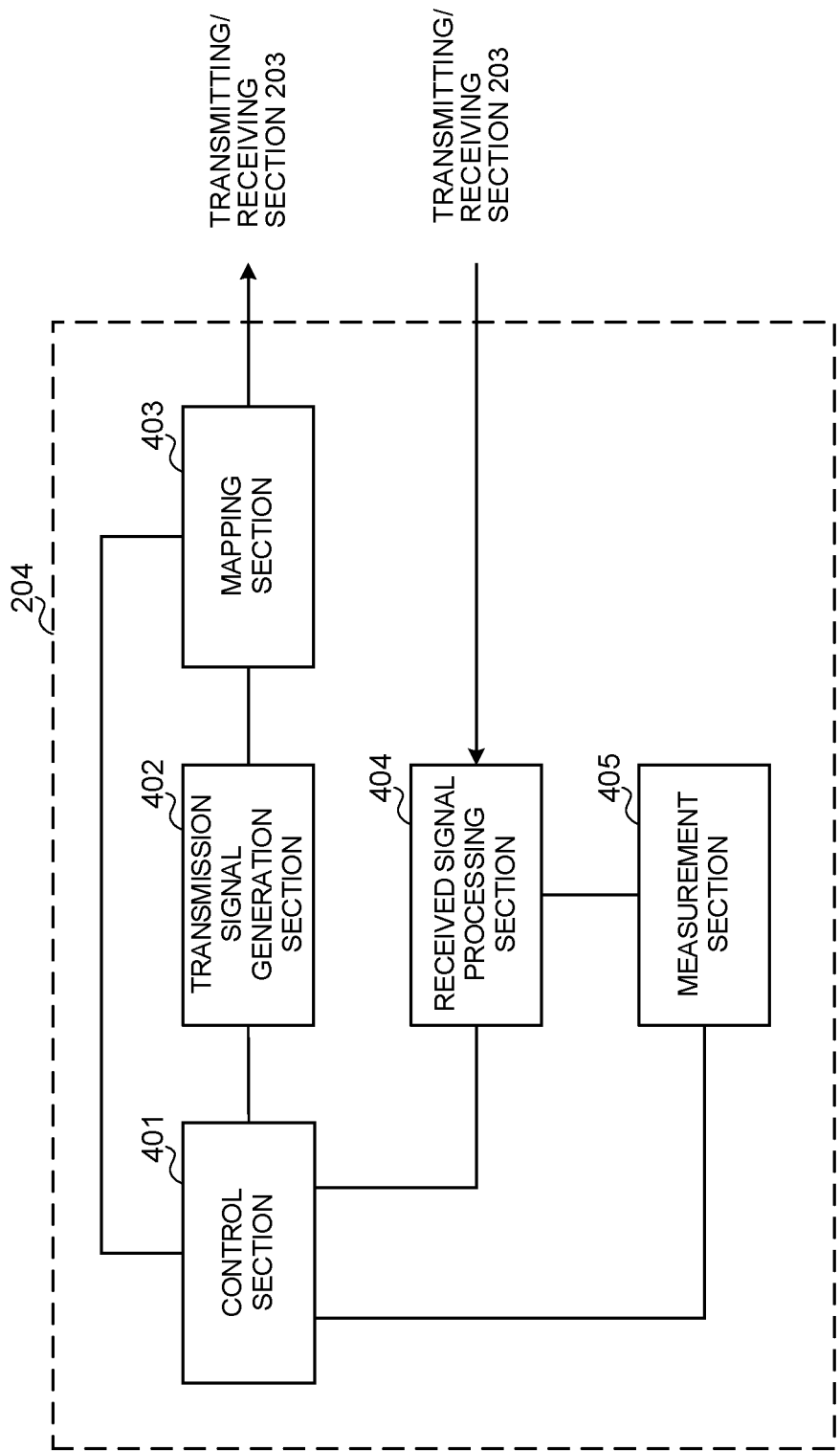
FIG. 21 is a diagram to show an example of a functional structure of a user terminal according to one embodiment of the present invention.

FIG. 21 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

Furthermore, when various kinds of information signaled from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is signaled from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401.

The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

Furthermore, the control section 401 may control the selection of radio resources for use for transmitting a sequence (for example, a sequence-based PUCCH), from among a number of radio resources (for example, PUCCH resources) designated in configuration information (for example, PUCCH resource configuration information) signaled from the radio base station 10, based on radio resources associated with identification information (for example, the signaling field) signaled from the radio base station 10.

Also, the multiple radio resources may each include a cyclic shift and/or a base sequence for the sequence.

Also, the configuration information may be signaled via higher layer signaling. The identification information may be signaled via downlink control information.

The multiple radio resources may each include a radio resource that is associated with uplink control information including a scheduling request, and a radio resource that is associated with uplink control information including no scheduling request (second embodiment).

The multiple radio resources may be each associated with one of uplink control information including a scheduling request and uplink control information not including a scheduling request. Then, based on the radio resource associated with the identification information, the control section 401 may select the radio resources associated with the other uplink control information (third embodiment).

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically integrated, or may be realized by directly and/or indirectly connecting two or more physically and/or logically separate pieces of apparatus (via wire or wireless, for example) and using these multiple pieces of apparatus.

Figure 22:
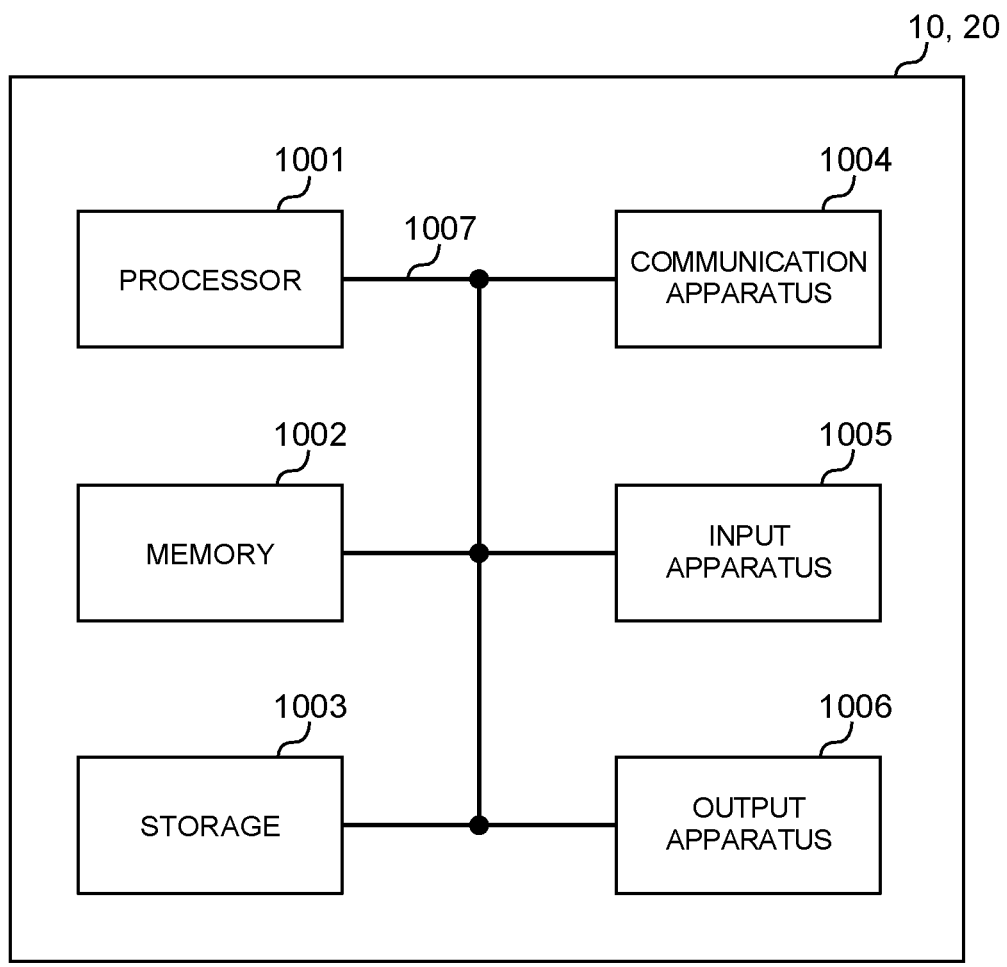
FIG. 22 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 22 is a diagram to show an example hardware structure of a radio base station and a user terminal according to one embodiment of the present invention. Physically, the above-described radio base stations 10 and user terminals 20 may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawing, or may be designed not to include part of the apparatus.

For example, although only one processor 1001 is shown, a number of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading given software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, registers and so on. For example, the above-described baseband signal processing section 104 (204), call processing section 105 and others may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented using at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) that does not depend on numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a number of minislots. Each mini-slot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a number of consecutive subframes may be referred to as a "TTI," or one slot or minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "minislot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a number of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource region of one subcarrier and one symbol.

Note that the structures of radio frames, subframes, slots, minislots, symbols and so on described above are merely examples. For example, configurations pertaining to the number of subframes included in a radio frame, the number of slots per subframe or radio frame, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented using other applicable information. For example, a radio resource may be specified by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a number of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Signaling of information is by no means limited to the aspects/embodiments described in this specification, and other methods may be used as well. For example, signaling of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be signaled using, for example, MAC control elements (MAC CEs (Control Elements)).

Also, signaling of given information (for example, signaling of information to the effect that "X holds") does not necessarily have to be sent explicitly, and can be sent implicitly (for example, by not signaling this piece of information, by signaling another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a number of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a number of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by its higher nodes (upper nodes). In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access."

As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a processor that determines a cyclic shift based on a cyclic shift index and uplink control information; and
a transmitter that transmits a sequence using the cyclic shift in an uplink control channel,
wherein when the uplink control information includes a Hybrid Automatic Repeat reQuest-ACKnowledge (HARQ-ACK) information and includes neither a positive Scheduling Request (SR) nor a negative SR, the cyclic shift is a specific cyclic shift obtained by adding a value to the cyclic shift index, the value corresponding to the HARQ-ACK information,
wherein when the uplink control information includes the HARQ-ACK information and the negative SR, the cyclic shift is the specific cyclic shift, and
wherein when the uplink control information includes the HARQ-ACK information and the positive SR, the cyclic shift is obtained by adding an offset to the specific cyclic shift.

2. The terminal according to claim 1, wherein the processor uses resource information indicated in a resource indicator field in downlink control information, out of a plurality of resource information configured by higher layer signaling, to control transmission of the uplink control information, wherein the resource information includes the cyclic shift index.

3. A radio communication method for a terminal comprising:
determining a cyclic shift based on a cyclic shift index and uplink control information; and
transmitting a sequence using the cyclic shift in an uplink control channel,
wherein when the uplink control information includes a Hybrid Automatic Repeat reQuest-ACKnowledge (HARQ-ACK) information and includes neither a positive Scheduling Request (SR) nor a negative SR, the cyclic shift is a specific cyclic shift obtained by adding a value to the cyclic shift index, the value corresponding to the HARQ-ACK information,
wherein when the uplink control information includes the HARQ-ACK information and the negative SR, the cyclic shift is the specific cyclic shift, and
wherein when the uplink control information includes the HARQ-ACK information and the positive SR, the cyclic shift is obtained by adding an offset to the specific cyclic shift.

4. A system comprising:
a terminal that comprises:
a processor that determines a cyclic shift based on a cyclic shift index and uplink control information; and
a transmitter that transmits a sequence using the cyclic shift in an uplink control channel; and
a base station that receives the sequence in the uplink control channel,
wherein when the uplink control information includes a Hybrid Automatic Repeat reQuest-ACKnowledge (HARQ-ACK) information and includes neither a positive Scheduling Request (SR) nor a negative SR, the cyclic shift is a specific cyclic shift obtained by adding a value to the cyclic shift index, the value corresponding to the HARQ-ACK information,
wherein when the uplink control information includes the HARQ-ACK information and the negative SR, the cyclic shift is the specific cyclic shift, and
wherein when the uplink control information includes the HARQ-ACK information and the positive SR, the cyclic shift is obtained by adding an offset to the specific cyclic shift.

* * * * *